United States Patent
Zhu et al.

(10) Patent No.: US 12,229,653 B2
(45) Date of Patent: Feb. 18, 2025

(54) METHODS AND APPARATUSES FOR IMPLEMENTING ADAPTIVE MULTI-TRACE CARVING TO TRACK SIGNAL TRACES

(71) Applicant: UNIVERSITY OF MARYLAND, COLLEGE PARK, College Park, MD (US)

(72) Inventors: Qiang Zhu, College Park, MD (US); Mingliang Chen, Greenbelt, MD (US); Min Wu, Clarksville, MD (US); Chau-Wai Wong, Apex, NC (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 568 days.

(21) Appl. No.: 17/276,577

(22) PCT Filed: Sep. 19, 2019

(86) PCT No.: PCT/US2019/051979
§ 371 (c)(1),
(2) Date: Mar. 16, 2021

(87) PCT Pub. No.: WO2020/061346
PCT Pub. Date: Mar. 26, 2020

(65) Prior Publication Data
US 2022/0051075 A1   Feb. 17, 2022

Related U.S. Application Data

(60) Provisional application No. 62/733,397, filed on Sep. 19, 2018.

(51) Int. Cl.
*G06N 3/04*   (2023.01)
*G10L 25/30*   (2013.01)

(52) U.S. Cl.
CPC ............ *G06N 3/04* (2013.01); *G10L 25/30* (2013.01)

(58) Field of Classification Search
CPC ........................................... G06N 3/04
See application file for complete search history.

(56) References Cited

U.S. PATENT DOCUMENTS

| 8,949,118 B2 | 2/2015 | Avargel et al. |
| 2013/0246062 A1* | 9/2013 | Avargel ............... G10L 25/90 704/E15.039 |

(Continued)

OTHER PUBLICATIONS

Ide et al. Improvement of Learning for CNN with ReLU Activation by Sparse Regularization. IEEE. 2017 (Year: 2017).*

(Continued)

*Primary Examiner* — Alexey Shmatov
*Assistant Examiner* — Robert Bejcek, II
(74) *Attorney, Agent, or Firm* — SQUIRE PATTON BOGGS (US) LLP

(57) ABSTRACT

Systems, methods, apparatuses, and computer program products for tracking weak signal traces under severe noise and/or distortions. A method may include tracking at least one candidate frequency trace from a time-frequency representation of a signal. The method may also include identifying a frequency trace of the signal based on tracking results. In addition, the method may include outputting an estimated frequency vector related to the frequency trace. Further, the tracking may be performed under a noisy condition environment.

14 Claims, 22 Drawing Sheets

(56) References Cited

U.S. PATENT DOCUMENTS

| | | | | |
|---|---|---|---|---|
| 2014/0358730 | A1* | 12/2014 | Achan | G06Q 30/0623 |
| | | | | 705/26.61 |
| 2016/0035078 | A1* | 2/2016 | Lin | G06V 10/772 |
| | | | | 382/157 |
| 2017/0221176 | A1* | 8/2017 | Munteanu | G06V 10/955 |
| 2019/0052958 | A1* | 2/2019 | Miller | G01H 3/06 |

OTHER PUBLICATIONS

Knack et al. Real-Time Content-Aware Video Retargeting for Tunnel Vision Assistance. Multimedia Content and Mobile Devices, edited by David Akopian, et al., Proc. of SPIE-IS&T Electronic Imaging, SPIE vol. 8667, 86670N • © 2013 SPIE-IS&T (Year: 2013).*

Convolutional Neural Networks Basics An Introduction to CNNs and Deep Learning. 2017 (Year: 2017).*

MIT Computer Vision. Advances in Computer Vision. Fall 2015 (Year: 2015).*

Wikipedia. Smoothing. The Wayback Machine—https://web.archive.org/web/20160504051658/https://en.wikipedia.org/wiki/Smoothing (Year: 2016).*

Avidan et al. Seam Carving for Content-Aware Image Resizing. ACM Transactions on Graphics, vol. 26, No. 3, Article 10, Publication date: Jul. 2007. (Year: 2007).*

International Search Report and Written Opinion dated Dec. 12, 2019 corresponding to International Patent Application No. PCT/US2019/051979.

J. Rissanen, "Modeling by Shortest Data Description", Automatica, vol. 14, pp. 465-471, International Federation of Automatic Control Pergamon Press Ltd. 1978, printed in Great Britain, 7 pages.

A. Nádas et al., "Speech Recognition Using Noise-Adaptive Prototypes", IEEE Transactions on Acoustics, Speech, and Signal Processing, vol. 37, No. 10, Oct. 1989, 9 pages.

Qiang Zhu et al., "Adaptive Multi-Trace Carving Based on Dynamic Programming", Asilomar 2018, 5 pages.

A. Hajj-Ahmad et al., "Spectrum Combining for ENF Signal Estimation", IEEE Signal Processing Letters, vol. 20, No. 9, Sep. 2013, DOI: 10.1109/LSP.2013.2272523, 4 pages.

S. Zahorian et al., "A Spectral/Temporal Method for Robust Fundamental Frequency Tracking", The Journal of the Acoustical Society of America 123, 4559 (2008); doi: 10.1121/1.2916590, 14 pages.

Y. Shi et al., "Spectrogram-Based Formant Tracking Via Particle Filters", Microsoft Research Asia, ICASSP 2003, 4 pages.

V. Mitra et al., "Time-Frequency Convolutional Networks for Robust Speech Recognition", Speech Technology and Research Laboratory, SRI International, Menlo Park, CA, ASRU 2015, 7 pages.

* cited by examiner

Algorithm 1 Offline Adaptive Multi-Trace Carving (AMTC)

1: procedure AMTC(Z, L)   ▷ L: number of output traces
2:   $Z_{(1)} \leftarrow Z$
3:   $f^*_{(1)} \leftarrow \underset{f}{\mathrm{argmax}}\, E_{Z_{(1)}}(f) + \lambda P(f)$
4:   $v^*_{(1)} \leftarrow \mathrm{DetectExistence}(Z_{(1)}, f^*_{(1)}, \Delta_{RER}, \Delta_1, \Delta_2)^2$
5:   for $l \leftarrow 2$ to $L$ do
6:     Update $Z_{(l)}$ according to (7)
7:     $f^*_{(l)} \leftarrow \underset{f}{\mathrm{argmax}}\, E_{Z_{(l)}}(f) + \lambda P(f)$
8:     $v^*_{(l)} \leftarrow \mathrm{DetectExistence}(Z_{(l)}, f^*_{(l)}, \Delta_{RER}, \Delta_1, \Delta_2)$
9:   end for
10:  return $f^*_{(1:L)}, v^*_{(1:L)}$
11: end procedure

FIG. 3

Algorithm 2 Online AMTC at time $n$

1: procedure AMTC($\mathbf{Z}_{(l,L)}(\tau_1:\tau_2-1)$, $\mathbf{G}_{(l,L)}(\tau_1:\tau_2-1)$, $\hat{f}_{(l,L)}^{prev}(\tau_1:\tau_2)$)  $\triangleright \tau_1 \triangleq n - k_1$, $\tau_2 \triangleq n + k_2$
2:    $\mathbf{Z}_{(l)}(\tau_1:\tau_2) \leftarrow$ concatenate $\mathbf{Z}_{(l,L)}(\tau_1:\tau_2-1)$ and $\mathbf{Z}_{(l)}(\tau_2)$
3:    Update $\mathbf{G}_{(l)}(\tau_2)$ according to (4) using $\mathbf{G}_{(l)}(\tau_2-1)$ and $\mathbf{Z}_{(l)}(\tau_2)$
4:    $T_e \leftarrow \tau_2 - 1$
5:    for $l \leftarrow 1$ to $L$ do
6:      Estimate $\hat{f}_{(l)}(T_e + 1 : \tau_2)$ according to (5) using $\mathbf{G}_{(l)}(T_e + 1 : \tau_2)$
7:      if $l < L$ then
8:        Update $\mathbf{Z}_{(l+1)}(T_e + 1 : \tau_2)$ according to (7) using $\mathbf{Z}_{(l)}(T_e + 1 : \tau_2)$ and $\hat{f}_{(l)}(T_e + 1 : \tau_2)$
9:      end if
10:      for $i \leftarrow T_e$ to $\tau_1$ do
11:        Estimate $\hat{f}_{(l)}(i)$ according to (5) using $\hat{f}_{(l)}(i + 1)$ and $\mathbf{G}_{(l)}(i)$
12:        if $l < L$ then
13:          Update $\mathbf{Z}_{(l+1)}(i)$ according to (7) using $\mathbf{Z}_{(l)}(i)$ and $\hat{f}_{(l)}(i)$
14:        end if
15:        if $\hat{f}_{(l)}(i) == \hat{f}_{(l)}^{prev}(i)$ then
16:          Update $\mathbf{G}_{(l+1)}(i + 1 : \tau_2)$ according to (4) using $\mathbf{Z}_{(l+1)}(i + 1 : \tau_2)$
17:          $\hat{f}_{(l)}(\tau_1:\tau_2) \leftarrow \hat{f}_{(l)}^{prev}(\tau_1:\tau_2)$
18:          $T_s \leftarrow i$
19:          break
20:        else if $i == \tau_1$ then
21:          Update $\mathbf{G}_{(l+1)}(\tau_1:\tau_2)$ according to (4) using $\mathbf{Z}_{(l+1)}(\tau_1:\tau_2)$
22:          $T_s \leftarrow i$
23:        end if
24:      end for
25:      $\hat{\delta}_{(l)}(\tau_1:\tau_2) =$ DetectExistence($\mathbf{Z}_{(l,L)}(\tau_1:\tau_2)$, $\hat{f}_{(l)}(\tau_1:\tau_2)$, $\Delta_{KKK}$, $\Delta_1$, $\Delta_4$)
26:      $\hat{f}_{(l)}(n) \leftarrow \hat{f}_{(l)}(n)$, $v_{(l,L)}^*(n) \leftarrow \hat{v}_{(l)}(n)$
27:    end for
28:    return $\hat{f}_{(l,L)}(n)$, $v_{(l,L)}^*(n)$, $\mathbf{Z}_{(l,L)}(n + 1 : \tau_2)$, $\mathbf{G}_{(l,L)}(n + 1 : \tau_2)$, $\hat{f}_{(l,L)}(\tau_1 + 1 : \tau_2)$
29: end procedure

FIG. 5

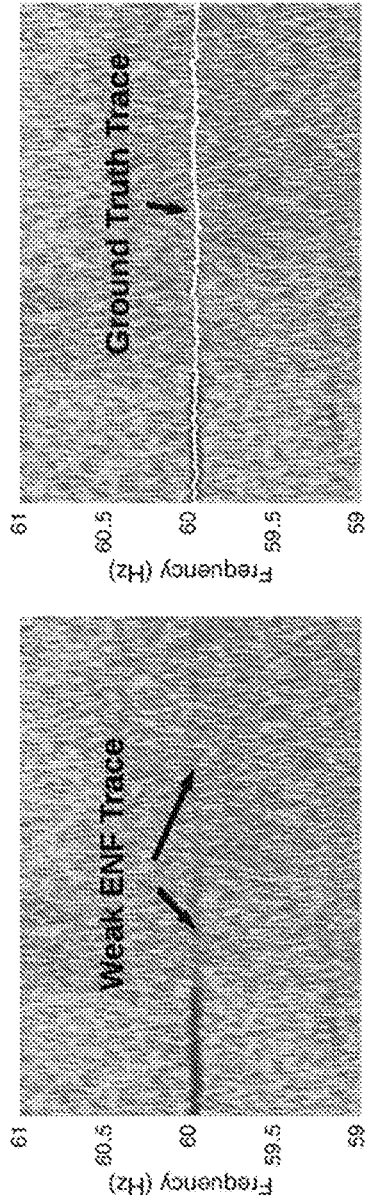
FIG. 12(a)
FIG. 12(b)
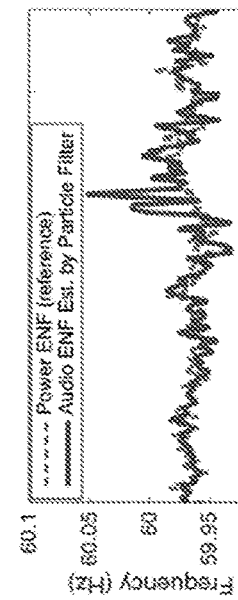
FIG. 12(c)
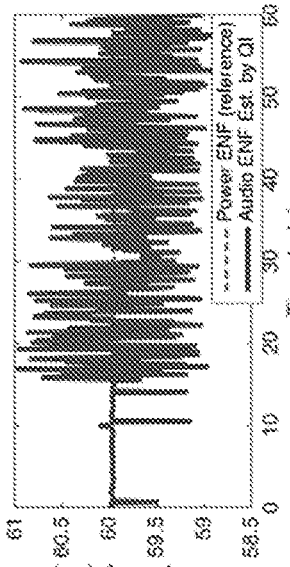
FIG. 12(d)
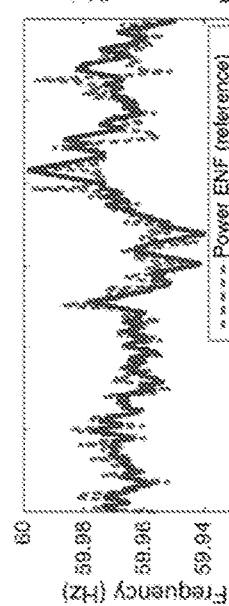
FIG. 12(e)
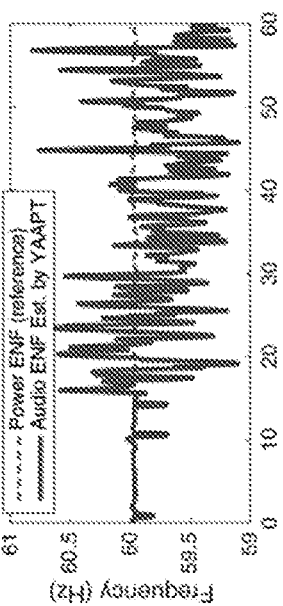
FIG. 12(f)

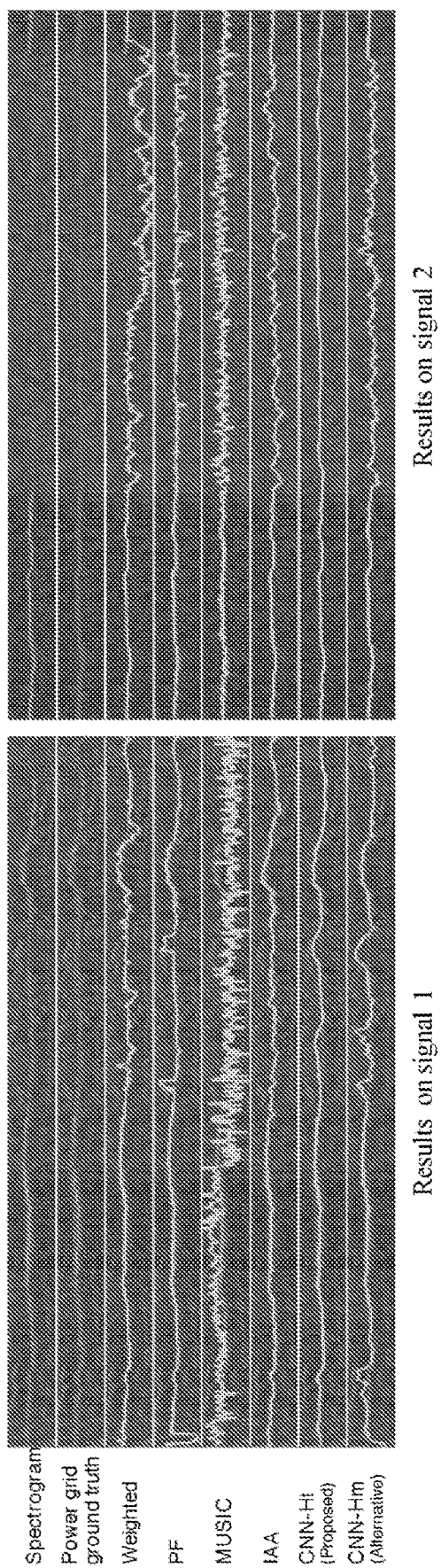
FIG. 18(a) Results on signal 1
FIG. 18(b) Results on signal 2

METHODS AND APPARATUSES FOR IMPLEMENTING ADAPTIVE MULTI-TRACE CARVING TO TRACK SIGNAL TRACES

CROSS-REFERENCE TO RELATED APPLICATIONS

This application claims priority from U.S. provisional patent application No. 62/733,397 filed on Sep. 19, 2018. The contents of this earlier filed application are hereby incorporated by reference in their entirety.

FIELD

Some example embodiments may generally relate to detecting and/or estimating frequency components from a signal. For example, certain embodiments may relate to apparatuses, systems, and/or methods for tracking weak signal traces under severe noise and/or distortions.

BACKGROUND

The recent development of advanced editing tools, and a vast amount of training data, along with easy access to a number of trained deep models make manipulating media content much easier than before. As a result, important information contained in the digital recording, such as the time of the recording, the place of the recording, and the identity of a person in a scene may no longer be trustworthy. Recent research has shown the potential for information forensics that is concerned with determining the authenticity, processing history, and origin of the digital multimedia content with no or minimal reliance on side channels other than the digital content itself. In addition, emerging novel sensing and analytics have provided convenient ways, often without physical contacts such as through multimedia recordings and/or radio-frequency sensing, to obtain such useful information as a person's heart rate and respiratory rate, just to name a few. The authentication as well as sensing analytics in many such applications may be heavily dependent on the imperceptible environmental frequency traces or the physiological frequency traces in the sensor recordings. In the presence of a reference source to compare and validate, a forensic investigator might first extract the traces from the recording and then test the authenticity by evaluating the similarities between certain statistics of the reference trace and those of the extracted ones.

As the extraction of the frequency-trace-of-interest may often play a key role in such forensic applications, one may need to cautiously take into account several considerations before a frequency estimator is deployed. For example, the considerations may include whether the existence of the frequency components may be accurately detected from the digital recording, and whether when a frequency component is detected, if the frequency can be accurately estimated, especially in a commonly seen low signal-to-noise ratio (SNR) condition.

Further, solving the detection and the estimation problems described above may be nontrivial due to the relatively low signal strength of the components-of-interest compared with the amplitude of other audio or visual contents in the recordings. Thus, there may be several challenges in these applications including, for example, low SNR conditions and confusion from coexisting quasiperiodic sources. Accordingly, to successfully estimate the frequency of interest within the noise signal, it may be desired that an algorithm be robust under strong noise and have the capability to exclude strong interference. Traditional estimation algorithms may often be applied individually to each temporal segment, assuming a segment-wise signal stationarity. Further, subspace methods such as multiple signal classification (MUSIC) and estimation of signal parameters via rotational invariance technique (ESPIRIT) may build pseudo power spectra using parametric models of pure sinusoids. These frame-wise estimation algorithms cannot explicitly exploit the temporal correlation of neighboring segments and become less accurate as the SNR drops and frequently generate outliers.

SUMMARY

One embodiment may be directed to a method. The method may include tracking at least one candidate frequency trace from a time-frequency representation of a signal, which may be visualized using a spectrogram plot or other means alike. The method may also include identifying a frequency trace of the signal based on tracking results. The method may further include outputting an estimated frequency vector related to the frequency trace. In an example embodiment, the tracking may be performed under a noisy condition environment.

Another example embodiment may be directed to an apparatus. The apparatus may include means for tracking at least one candidate frequency trace from a time-frequency representation of a signal. The apparatus may also include means for identifying a frequency trace of the signal based on tracking results. The apparatus may further include means for outputting an estimated frequency vector related to the frequency trace. In an example embodiment, the tracking may be performed under a noise condition environment.

Another example embodiment may be directed to an apparatus which may include at least one processor and at least one memory including computer program code. The at least one memory and the computer program code may be configured to, with the at least one processor, cause the apparatus at least to, track at least one candidate frequency trace from a time-frequency representation of a signal. The apparatus may also be caused to identify a frequency trace of the signal based on tracking results. The apparatus may further be caused to output an estimated frequency vector related to the frequency trace. In an example embodiment, the tracking may be performed under a noisy condition environment.

In accordance with some example embodiments, a non-transitory computer readable medium may be encoded with instructions that may, when executed in hardware, perform a method. The method may include tracking at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, a computer program product may perform a method. The method may include tracking at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, an apparatus may include circuitry configured to track at least one candidate frequency trace from a time-frequency representation of a signal. The apparatus may also include circuitry configured to identify a frequency trace of the signal based on tracking results. The apparatus may further include circuitry configured to output an estimated frequency vector related to the frequency trace. In an example embodiment, the tracking may be performed under a noisy condition environment.

In accordance with some example embodiments, a method may include tracking, via a convolutional neural network, at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, an apparatus may include means for tracking, via a convolutional neural network, at least one candidate frequency trace from a time-frequency representation of a signal. The apparatus may also include means for identifying a frequency trace of the signal based on tracking results. The apparatus may further include means for outputting an estimated frequency vector related to the frequency trace. In an example embodiment, the tracking may be performed under a noisy condition environment.

In accordance with some example embodiments, an apparatus may include at least one processor and at least one memory including computer program code. The at least one memory and the computer program code may be configured to, with the at least one processor, cause the apparatus at least to track, via a convolutional neural network, at least one candidate frequency trace from a time-frequency representation of a signal. The apparatus may also be caused to identify a frequency trace of the signal based on tracking results. The apparatus may further be caused to output an estimated frequency vector related to the frequency trace. In an example embodiment, the tracking may be performed under a noisy condition environment.

In accordance with some example embodiments, a non-transitory computer readable medium may be encoded with instructions that may, when executed in hardware, perform a method. The method may include tracking, via a convolutional neural network, at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, a computer program produce may perform a method. The method may include tracking, via a convolutional neural network, at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, an apparatus may include circuitry configured to track, via a convolutional neural network, at least one candidate frequency trace from a time-frequency representation of a signal. The apparatus may also include circuitry configured to identify a frequency trace of the signal based on tracking results. The apparatus may further include circuitry configured to output an estimated frequency vector related to the frequency trace. In an example embodiment, the tracking may be performed under a noisy condition environment.

In accordance with some example embodiments, a method may include tracking, via a multiple frequency traces tracking and detection procedure, at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, an apparatus may include means for tracking, via a multiple frequency traces tracking and detection procedure, at least one candidate frequency trace from a time-frequency representation of a signal. The apparatus may also include means for identifying a frequency trace of the signal based on tracking results. The apparatus may further include means for outputting an estimated frequency vector related to the frequency trace. In an example embodiment, the tracking may be performed under a noisy condition environment.

In accordance with some example embodiments, an apparatus may include at least one processor and at least one memory including computer program code. The at least one memory and the computer program code may be configured to, with the at least one processor, cause the apparatus at least to track, via a multiple frequency traces tracking and detection procedure, at least one candidate frequency trace from a time-frequency representation of a signal. The apparatus may also be caused to identify a frequency trace of the signal based on tracking results. The apparatus may further be caused to output an estimated frequency vector related to the frequency trace. In an example embodiment, the tracking may be performed under a noisy condition environment.

In accordance with some example embodiments, a non-transitory computer readable medium may be encoded with instructions that may, when executed in hardware, perform a method. The method may include tracking, via a multiple frequency traces tracking and detection procedure, at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, a computer program product may perform a method. The method may include tracking, via a multiple frequency traces tracking and detection procedure, at least one candidate frequency trace from a time-frequency representation of a signal. The method may also include identifying a frequency trace of the signal based on tracking results. The method may further include outputting an estimated frequency vector related to the frequency trace. In an example embodiment, the tracking may be performed under a noisy condition environment.

In accordance with some example embodiments, an apparatus may include circuitry configured to track, via a multiple frequency traces tracking and detection procedure, at least one candidate frequency trace from a time-frequency representation of a signal. The apparatus may also include circuitry configured to identify a frequency trace of the signal based on tracking results. The apparatus may further include circuitry configured to output an estimated frequency vector related to the frequency trace. In an example embodiment, the tracking may be performed under a noisy condition environment.

BRIEF DESCRIPTION OF THE DRAWINGS

For proper understanding of example embodiments, reference should be made to the accompanying drawings, wherein:

FIG. 3 illustrates a pseudo code algorithm of an offline AMTC, according to an example embodiment.

FIG. 5 illustrates an online AMTC algorithm, according to an example embodiment.

FIG. 12(a) illustrates a spectrogram for a sample electric network frequency (ENF), according to an example embodiment.

FIG. 12(b) illustrates a ground truth frequency overlaid version of the sample ENF audio signal, according to an example embodiment.

FIG. 12(c) illustrates trace estimates returned by offline-AMTC, according to an example embodiment.

FIG. 12(d) illustrates trace estimates returned by a particle filter, according to an example embodiment.

FIG. 12(e) illustrates trace estimates returned by YAAPT, according to an example embodiment.

FIG. 12(f) illustrates trace estimates returned by a quadratic interpolation, according to an example embodiment.

FIG. 18(a) illustrates results on an ENF dataset, according to an example embodiment.

FIG. 18(b) illustrates further results of an ENF dataset, according to an example embodiment.

DETAILED DESCRIPTION

Figure 1B:
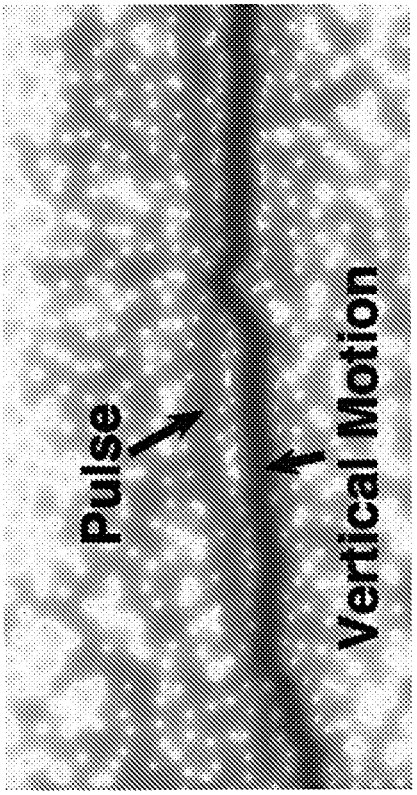
FIG. 1(b) illustrates a spectrogram image of a remote-photoplethysmogram signal, according to an example embodiment.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for tracking weak signal traces under severe noise and/or distortions.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may exploit a signal's time-frequency feature map, such as a spectrogram, to perform a frequency estimation. According to one example embodiment, it may be possible to provide a multiple frequency traces tracking and detection method based on iterative dynamic programming and adaptive trace compensation for certain media forensic tasks. Further, finding a smooth frequency trace may be treated as finding the maximum energy trace in a spectrogram, with an additional regularization term that favors close frequency estimates in consecutive time bins. According to certain example embodiments, such problems may be solved using dynamic programming.

In certain forensic applications, the presence of multiple traces within the frequency range of interest may be possible. For instance, one example embodiment may provide an Adaptive Multi-Trace Carving (AMTC) method to track all candidate traces. The signal frequency tracking method may be applied to obtain the dominating frequency, and the previous trace energy may be compensated at the end of each iteration to facilitate the estimation of the next trace. After several iterations, all traces within the frequency range of interest may be obtained. In addition, another example embodiment may provide an efficient quasi real-time algorithm by utilizing the Markovian property of traces and introducing a bidirectional time window referred to as an online-AMTC. Although spectrogram may be considered, techniques of certain other example embodiments may be applied to other representations or visualizations for the signal for which the temporal tracking of signal traces is needed.

According to certain example embodiments, a robust and versatile frequency tracking and detection approach may be provided for various tasks including, for example, frequency-based media forensics. In one example embodiment, the frequency tracking and detection approach may be able to track multiple frequency traces in a very low (e.g., 10 dB) SNR condition accurately and efficiently. This method may work in general for various statistical frequency variations, and may not assume the availability of training data to learn a prior knowledge of the signal characteristics.

According to another example embodiment, it may be possible to adapt an offline-AMTC algorithm into an efficient near real-time implementation. For instance, the computational complexity may be reduced with a queue data structure and maintain the performance compared with an offline version. Further, according to an example embodiment, it may be possible to conduct extensive experiments using challenging synthetic and real-world forensic data. For instance, it may be possible to implement several estimation methods for other applications (e.g., the pitch estimation), re-trained (the factorial hidden Markov model based method), and other comparable methods. The results demonstrate that the approaches of certain embodiments outperform other existing arts in terms of accuracy and efficiency. Another example embodiment may provide a method based on the AMTC framework to accurately test the presence of trace.

In certain example embodiments, a number of information forensic analyses may boil down to the micro signal extraction problem where the signal-of-interest has smaller magnitudes, typically one order of magnitude or more, than the dominating signals. Among such forensic applications, the Electric Network Frequency (ENF) and remote-photoplethysmography (rPPG) are two possible directions that may help to test the media authenticity.

A digital audio or video recorder may pick up ENF signals because of interference from electromagnetic fields generated from the power sources, acoustic hum, and mechanical vibrations produced by electric-powered devices, of the ENF-induced illumination change of a fluorescent or incandescent bulb. The place and the time of the recording may be validated by matching the characteristics of ENF variations estimated from the recording with the ones from the power grid, which may be treated as a reference source. Further, the rPPG technology may be applied to address the face forensic problems as it has been shown that a person's instantaneous pulse rate (PR) may be extracted from his/her face video by examining the pulse-induced color change that appears on the facial skin pixels, even when the video contains significant subject motion or environmental change. Similar to ENF, the characteristics of the PR may be used for physiological forensic tasks if a reference PR recording of that person is available.

Tracking a single frequency may pose a problem, particularly when, without a backward smoothing procedure, the output tracing results tend to be inaccurate when substantial interference exists, and the resampling stage makes the algorithm time-consuming. Previously, trace dynamic knowledge was utilized, and the problem as formulated as a hidden Markov model (HMI) problem. In particular, the maximum a posteriori probability estimate may be calculated by running a Viterbi solver. However, a key building block, the emission probability, requires the knowledge of SNR, which may often be unknown. A recently developed Yet Another Algorithm for Pitch Tracking (YAAPT) focuses on a single pitch estimation of a speech signal based on spectrogram and correlogram images. Dynamic programming may be used to estimate the fundamental frequency trace from a set of candidate peaks of proposed harmonic spectral features. It may result in a good performance in high SNR cases, but may often generate biased estimates under low SNR as the probability that a local peak represents the true signal frequency drops significantly.

Several problems may occur with tracking multiple frequency components from the spectrogram image. For example, image processing techniques such as morphological operators and active contour methods have been applied in this area. However, these methods may be difficult to be adapted into real-time tracking algorithms. Further, the probability of pitch using Gaussian mixture models (GMMs) may be modeled, and the junction tree algorithm may be used to decode a speaker-dependent factorial HMM (fHMM). In a similar approach, the emission probability may be modeled by a deep neural network (DNN). Although both methods may provide excellent performance in terms of accuracy, it is sometimes impossible to fit into real-world needs. This may be due to the training phase requiring a large amount of real-world data, which may often be unavailable for most tasks. In addition, it may be relatively time-consuming to compute the frame-wise joint emission probability and to decode the fHMM with the junction tree algorithm.

In one embodiment, a frequency tracking problem may be formulated for scenarios where only a single trace exists in a frequency range of interest. For example, $Z \in \mathbb{R}_+^{M \times N}$ may be the magnitude of a signal spectrogram image, which has N discretized bins along the time axis, and M bins along with frequency axis. In one embodiment, a frequency trace may be defined as $$f = \{(f(n), n)\}_{n=1}^N \quad (1)$$

where $f: [1, N] \to [M]$ is a function. Given the spectrogram Z and a candidate trace $f$ an energy function for the trace may be defined as $E(f) = \sum_{n=1}^N Z(f(n), n)$. A reasonable estimate of the frequency trace for the given signal may be the trace f* that maximizes the energy function shown as follows.

$$f^* = \operatorname*{argmax}_{f} E(f) \quad (2)$$

According to an embodiment, problem (2) may be equivalent to a peak finding method where $f^*(n) = \operatorname*{argmax}_{f(n)} Z(f(n), n), \forall n \in [1, N]$. It may also share similar spirit as the weighted average approach.

In an embodiment, to take into consideration the smoothness assumption of the trace along the time, a regularization term that penalizes jumps in the frequency value may be added. The change of the frequency value may be modeled between two consecutive bins at n−1 and n as a one-step discrete-time Markov chain, characterized by a transition probability matrix $P \in \mathbb{R}^{M \times M}$, where $P_{m'm} = m | f(n-1) = m'$, $\forall m, m' = 1, \ldots, m$, and $\forall n = 2, \ldots, N$. Further, in an example embodiment, the regularized single trace frequency tracking problem may be formulated as follows $$f^* = \operatorname*{argmax}_{f} E(f) + \lambda P(f), \quad (3)$$

where $$P(f) \triangleq \log P(f(1)) + \sum_{n=2}^N \log P(f(n) | f(n-1)),$$

and $\lambda > 0$ may be a regularization parameter that controls the smoothness of the resulting trace.

According to certain example embodiments, for efficient tracking via dynamic programming, the regularized tracking problem in (3) may be solved efficiently via dynamic programming. For instance, an accumulated regularized maximum energy map may be iteratively computed. In an example embodiment, the accumulated regularized maximum energy map $G \in \mathbb{R}_+^{N \times M}$ may be computed column by column for all entries (m, n) as follows $$G(m, n) = Z(m, n) + \max_{m'=1,\ldots,M} \{G(m', n-1) + \lambda \log P_{m'm}\}. \quad (4)$$

In an embodiment, after completing the calculation at column n=N, the maximum value of the Nth column may be denoted as $f^*(N)$. In addition, the optimal solution may be found by backtracking from the maximum entry of the last column of the accumulated map G. For instance, n may be iterated from N−1 to 1 to solve for $f^*(n)$ as follows $$f^*(n) = \operatorname*{argmax}_{f(n)} G(f(n), n) + \lambda \log P_{f(n) f^*(n+1)}. \quad (5)$$

According to an example embodiment, it may be possible to avoid transitions from state m' to state m by setting $P_{m'm} = 0$, as the regularized term may penalize the total energy to $-\infty$. In an example embodiment, if uniform random walk transitions are assumed, (i.e., $$\left(\text{i.e., } P_{m'm} = \frac{1}{2k+1}, |m' - m| \le k\right),$$

then problem (3) may be degenerated to a seam carving problem, and in this case the value $\lambda$ does not affect the solution.

In certain example embodiments, trace existence detection for a given time window may be provided. For instance, according to an example embodiment, independent decisions may be made for every frame within a window when determining the existence of a frequency component in a certain time window. Then, the decisions may be refined by taking into consideration neighborhood correlations. According to an example embodiment, the frames with a frequency component may be referred to as voiced frames, or otherwise as unvoiced frames. In another example embodiment, the existence of a frequency component may be tested by evaluating the energy of the detected trace. According to other example embodiments, hypothesis tests may be performed on voiced frames and, thus, be conducted by thresholding a test statistic such as the Relative Energy Ratio (RER) defined as follows $$RER_{(l)}(n) = \frac{|\mathcal{F}_{(l)}(n)| * Z(f^*_{(l)}(n), n)}{\sum_{m \in \mathcal{F}_{(l)}(n)} Z(m, n)}. \quad (6)$$

In (6), $\mathcal{F}_{(l)}(n) \triangleq [1, M] \setminus [\max(1, f_{(l)}^*(n)-\delta_f), \min(M, f_{(l)}^*(n)+\delta_f)]$ is a conservative set of frequency indices that does not contain the frequency indices around the lth estimated frequency. Further, in (6), $\delta_f$ may be a predetermined parameter, and |•| may be the cardinality of a set. In an embodiment, the higher $RER_{(l)}(n)$ may be, the more probable that the nth frame may be voiced. In addition, a decision may be made by comparing the test statistic $RER_{(l)}(n)$ with an empirically determined threshold $\Delta_{RER}$. In an embodiment, consecutive unvoiced frames may be grouped into a segment when the length is greater than $\Delta_1$, and consecutive unvoiced segments may be grouped into one segment if the distance between the two are smaller than $\Delta_2$, where $\Delta_1$ and $\Delta_2$ are two predetermined parameters.

Figure 1A:
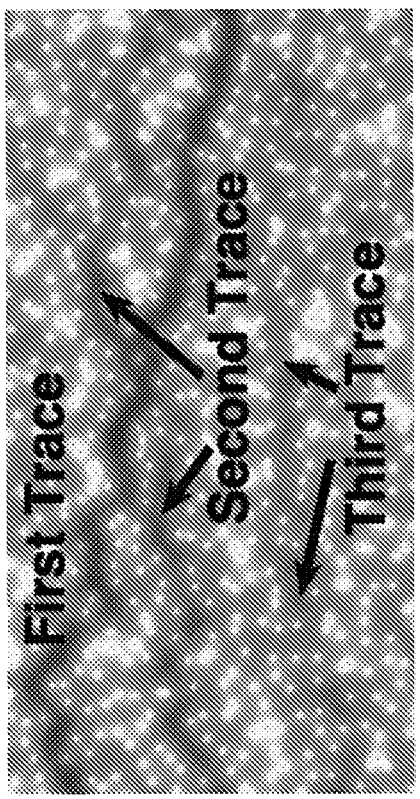
FIG. 1(a) illustrates a spectrogram image of a synthetic −10 dB signal with three frequency components, according to an example embodiment.
Figure 1D:
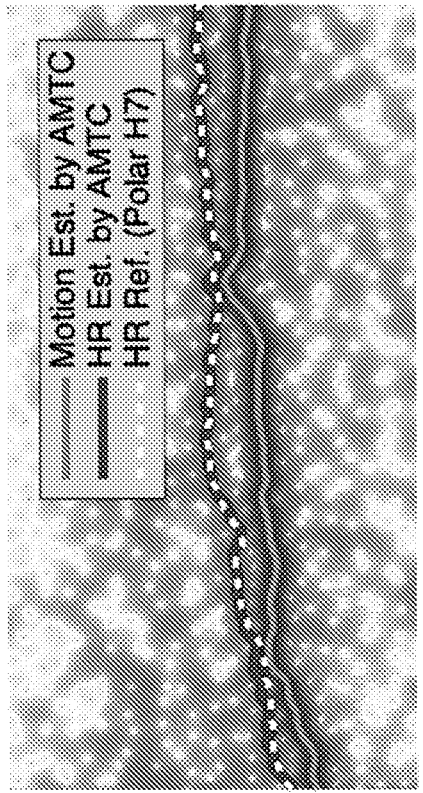
FIG. 1(d) illustrates the same image as FIG. 1(b) that is overlaid with a heart rate estimate after compensating a first trace estimate using adaptive multi-trace carving (AMTC), according to an example embodiment.
Figure 1C:
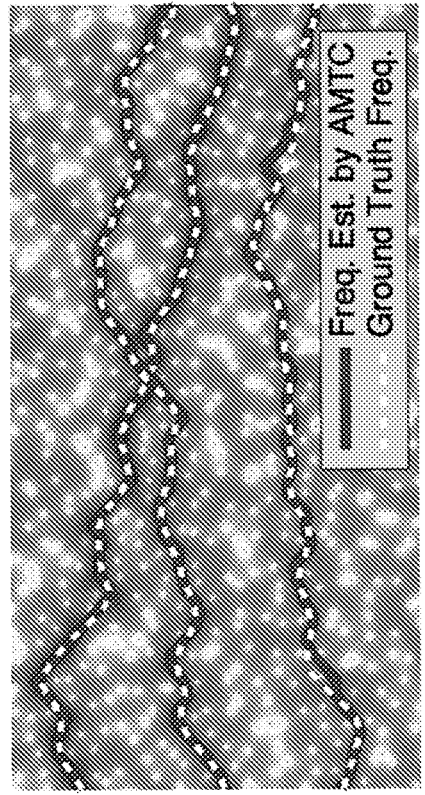
FIG. 1(c) illustrates the same image as FIG. 1(a) that is overlaid with ground truth frequency components and frequency estimates, according to an example embodiment.

FIGS. 1(a)-1(d) illustrate spectrogram images, according to an example embodiment. For example, FIG. 1(a) illustrates a spectrogram image of a synthetic −10 dB signal with three frequency components. Further, FIG. 1(b) illustrates a spectrogram image of a remote-photoplethysmogram signal with a weak heart pulse trace embedded in a strong trace induced by subject motion running. In addition, FIG. 1(c) illustrates the same image as in FIG. 1(a) that is overlaid with ground truth frequency components, and the frequency estimates using AMTC. Additionally, FIG. 1(d) illustrates the same image as FIG. 1(b) that is overlaid with heart rate estimation after compensating a first trace estimate using AMTC. According to certain example embodiments, the estimation result may be compared with the heart rate simultaneously measured by an electrocardiogram based sensor.

Figure 2A:
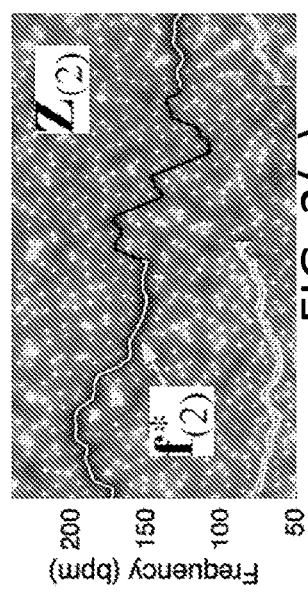
FIG. 2(a) illustrates an offline AMTC estimation process, according to an example embodiment.
Figure 2B:
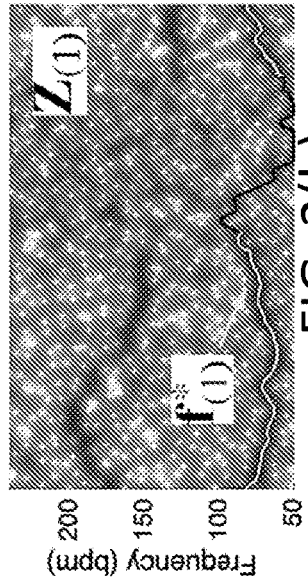
FIG. 2(b) illustrates another offline AMTC estimation process, according to an example embodiment.
Figure 2C:
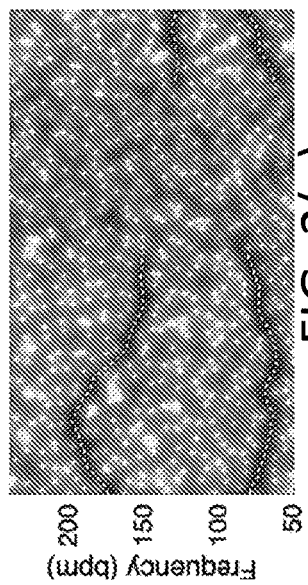
FIG. 2(c) illustrates a further offline AMTC estimation process, according to an example embodiment.
Figure 2D:
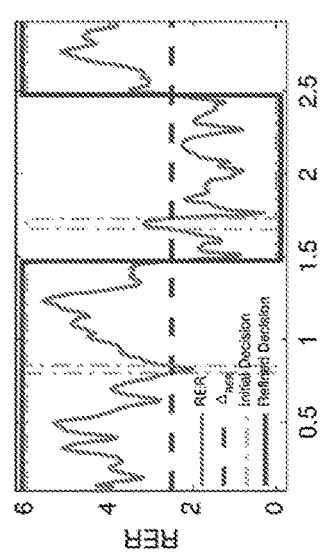
FIG. 2(d) illustrates another offline AMTC estimation process, according to an example embodiment.
Figure 2E:
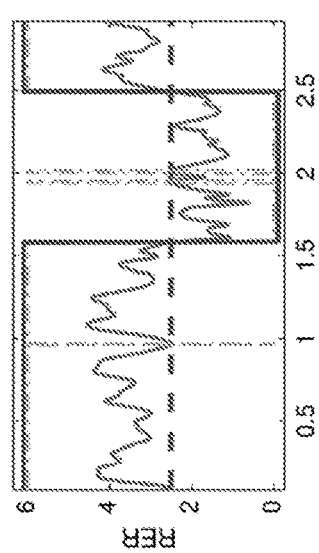
FIG. 2(e) illustrates another offline AMTC estimation process, according to an example embodiment.
Figure 2F:
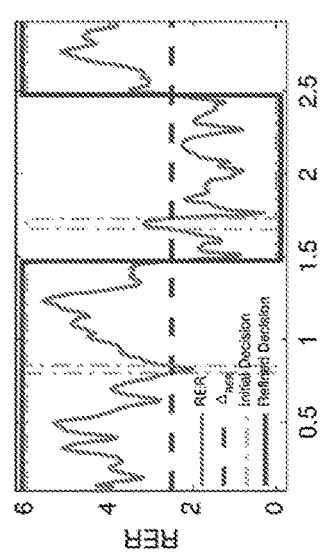
FIG. 2(f) illustrates another offline AMTC estimation process, according to an example embodiment.

FIGS. 2(a)-2(f) illustrate an offline AMTC estimation process, according to an example embodiment. In particular, FIGS. 2(a)-2(f) illustrates an example of a two-trace estimation process on a synthetic heart beat signal, according to an embodiment. As illustrated in FIGS. 2(a)-2(f), the final estimate may almost be identical with the ground truth. Additionally, FIG. 2(a) illustrates a spectrogram of a synthetic −8 dB signal with two frequency components. As illustrated in FIG. 2(a), the unvoiced segment is from 1.5 to 2.5 min (white dots: ground truth). In addition, FIGS. 2(b) and 2(c) illustrate first and second trace estimates, respectively. For instance, FIGS. 2(b) and 2(c) illustrate first and second trace estimates in voiced decision regions and unvoiced decision regions by AMTC. Further, FIG. 2(d) illustrates final trace estimates. In addition, FIGS. 2(e) and 2(f) illustrate a test statistic RER and the corresponding voiced decision. According to an embodiment, the final decisions in FIGS. 2(e) and 2(f) may exclude all short segments, and the result may be more robust compared to that of the initial decision.

According to certain example embodiments, multiple traces may be tracked via iterative frequency compensation. As previously described, a single frequency trace tracking method may use dynamic programming. In an embodiment, for quasiperiodic signal estimation tasks such as heart rate monitoring using the rPPG method in a fitness setting, there may be multiple traces in the frequency range of interest, and the dominating trace in the spectrogram might not be the one of interest. Thus, in an example embodiment, an offline multiple trace tracking method (Offline Adaptive Multi-Trace Carving (offline-AMTC)) may be provided by extracting the trace iteratively to find all candidates.

In an example embodiment, multiple traces may be greedily searched by iteratively running the single trace tracker. However, as frequency energy may be diffused around the center of each trace due to the smear effect and signal's quasiperiodicity, different trace estimates may lie in the same energy strap induced by similar frequency components. Thus, to address this issue, certain example embodiments may attenuate the diffused energy around the estimated frequency trace at the end of each iteration once the estimated frequency trace is obtained. In addition, the width of the energy strap around the estimated frequency trace may be estimated, and the energy that lies within may be compensated.

According to an example embodiment, $f_{(l)}$ may be the estimated frequency trace at the lth iteration. For each time frame of power spectrum $z_{(l)}(n)$, it may be possible to obtain the estimated range of the bumpy region near $f_{(l)}(n)$, for example, $m \in [m_1, m_2]$, by thresholding the first-order difference of $z_{(l)}(n)$ on the right and left side of $f_{(l)}(n)$. The updated equation for the compensated power spectrum at the (l+1)st iteration may be as follows $$Z_{(l+1)}(m, n) \leftarrow \left[1 - \exp\frac{-(m - f_{(l)}(n))^2}{2\hat{\sigma}_l^2(n)}\right] \cdot Z_{(l)}(m, n). \quad (7)$$

In (7), $$\hat{\sigma}_{(l)}^2(n) = \frac{\sum_{m=m_1}^{m_2} Z_{(l)}(m, n)(m - f_{(l)}(n))^2}{\sum_{m=m_1}^{m_2} Z_{(l)}(m, n)}$$

may be used to quantify the width of the energy strap at the lth iteration. The pseudo code of the offline AMTC is illustrated in FIG. 3 as Algorithm 1. In an example embodiment, L in Algorithm 1 may be defined as the number of traces to track. With this definition, the computational complexity for offline AMTC may be $O(NLM)^2$, while fHMM methods may require $O(NLM^{L+1})$ without considering operations for computing emission probability.

According to certain example embodiments, online AMTC may be implemented with low delay. The offline AMTC algorithm may minimize the adverse effect of noise by making use of full-length signals. In a delay-sensitive scenario that a fixed-length delay k is allowed, the tracking objective at the instance n may be to estimate $f_{1:L}^*(n)$ based on the available spectrogram information $Z_{(1)}(1:n+k)$. A simple approach may run offline AMTC from the instance 1 to n+k at each time instance n. If the total length of the frame is N, this approach may take $O(LN^2M^2)$ in time and $O(NM)$ in space. In certain embodiments, the time and space complexities may increase linearly in time n, which may lead to either memory overflow or system collapse, especially when the system is run for a period of days or months.

In certain embodiments, an efficient, quasi-real-time algorithm known as online AMTC may be used to address the storage and computational issues. For instance, in one embodiment, a fixed-length queue buffer for storing and updating the intermediate result of $Z_{(1:L)}$, $G_{(1:L)}$, and $\tilde{f}_{(1:L)}$. As a result, the running time and the memory requirement may be significantly reduced, and may be independent of time t.

Figure 4:
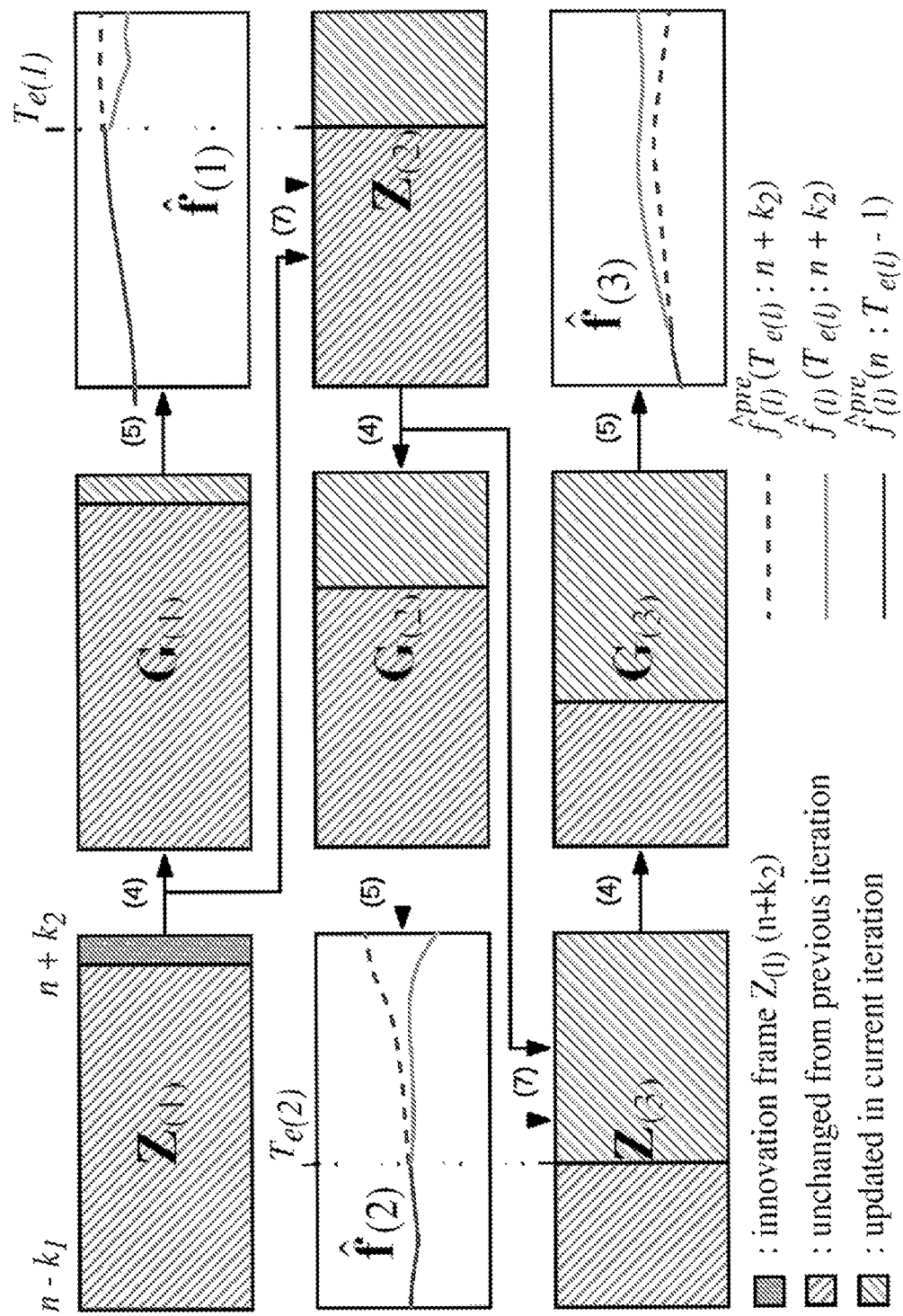
FIG. 4 illustrates a flowchart for online AMTC algorithms, according to an example embodiment.

FIG. 4 illustrates a flowchart for online AMTC algorithms, according to an example embodiment. For instance, the flowchart in FIG. 4 may represent an online AMTC algorithm for three traces estimation process at the tth iteration. Further, the (•) above the arrows indicates the index of the used equation, and FIG. 4 illustrates the processing flow of the online AMTC algorithm at the instance n. As illustrated in FIG. 4, $k_2$ may represent the allowed delay, and $f_{(1)}*(n-1)$ along with $k_2$ may be computed by backtracking from the accumulated regularized maximum energy map $G_{(1)}(n-1:n+k_2-1)^3$. At the arrival of the next innovation frame $Z_{(1)}(n+k_2)$ (the small frame at $Z_{(1)}$ in FIG. 4), $f_{(1)}*(n)$ may be estimated.

From the forward update rule of G in (4), it is clear that $G_{(1)}(n:n+k_2-1)$ would remain unchanged compared to the output in the previous time instance n−1. Thus, in certain embodiments, only the rightmost frame $G_{(1)}(n+k_2)$ may be updated given $G_{(1)}(n+k_2-1)$ and the innovation frame $Z_{(1)}(n+k_2)$ as shown in the middle box of the first row of FIG. 4. In an embodiment, $f_{(1)}*(n)$ may be obtained via backtracking from $G_{(1)}(n:n+k_2)$ according to (5). In addition, the previous backtracking result may be defined at time n−1 as $\hat{f}_1^{pre}(n-1:n+k_2-1)$. During the backtracking process for $f_{(1)}*(n)$, $\hat{f}_{(1)}(n: T_e) = \hat{f}_1^{pre}(n: T_e)$, for $T_e \in [n, n+k_2)$, if $\hat{f}_{(1)}(T_e) = \hat{f}_1^{pre}(T_e)$. This claim holds because $G_{(1)}(n: T_e)$ remains the same during the process. In this regard, $\hat{f}_1^{pre}(N-1:n+k_2-1)$ be stored and updated in a buffer, whereby the update process of $\hat{f}_1^{pre}$ may stop at the instance $T_e$ if $\hat{f}_{(1)}(T_e) = \hat{f}_1^{pre}(T_e)$, as shown in the right box of the first row in FIG. 4. According to this example embodiment, the computation complexity may be further reduced.

In certain example embodiments, any change from a previous trace estimation $\hat{f}_{(1:l-1)}$ may have an influence on the formation of $Z_{(l)}$, $G_{(l)}$, and therefore $f_{(l)}*$. According to an example embodiment, in order to obtain a robust estimate for $f_{(l)}*$, l>1, a look-back length, $k_1 > 0$, may be introduced in this process. As demonstrated from the second and third rows in FIG. 4, for lth trace estimation at time distance n, the previous trace estimates $\hat{f}_{(l-1)}(n-k_1:n+k_2)$ and $Z_{(l-1)}(n-k_1:n+k_2)$ may be utilized to obtain new $Z_{(l)}(n-k_1:n+k_2)$ and $G_{(l)}(n-k_1:n+k_2)$, and, thus, $\hat{f}_{(l)}(n-k_1:n+k_2)$. In another example embodiment, efficient backtracking may be achieved using the previous backtracking result, which may be the same as the case in estimating the first trace. Details of the online AMTC algorithm at the nth iteration is illustrated in FIG. 5 as Algorithm 2.

According to certain example embodiments, a performance analysis of AMTC may be performed. The results and comparisons in certain example embodiments may be made with known ground truth. For example, in a single trace, the performance of the AMTC algorithm may be evaluated using simulated data. For each test signal generated, a time-varying pulse rate trace may also be generated presenting from the beginning to the end of the timeline. More specifically, s[n] may be denoted as a temporal measurement of the corrupted frequency signal, $s[n] = \sin \Phi[n] + \epsilon[n]$, where $\Phi[n] = \Phi[n-1] + 2\pi f[n]/f_s$, f[n], is the time-varying synthesis frequency, $f_s$ is the sampling rate set to 30 Hz, and $\epsilon[n]$ is the noise quantified by a zero-mean white Gaussian process. According to an embodiment, the variance of $\epsilon[n]$ may be an adjustable parameter for achieving different SNR levels.

In an embodiment, to generate frequency signals f[n] that behave similarly as real-world pulse rate signals, a 9-tap autoregressive model may be trained using heart rate signals collected by a Polar H7 chest belt in both exercise mode and still mode. In another embodiment, beat per minute (bpm) may be used as the frequency unit, and the duration of each test signal may be 3 minutes. In addition, the spectrograms may be generated by short time Fourier transform (STFT) with a window length of 10 seconds and 98% overlap between neighboring frames. In another embodiment, the end of each frame may include padded zeros to make neighboring frequency bins 0.17 bpm apart.

With the above configuration, the algorithm of certain embodiments may be compared with the state-of-the-art particle filter method and the local peak based YAAPT method using a large scale synthetic dataset. In an example embodiment, particle filter method may correspond to a sequential Monte-Carlo based single frequency trace tracking method. The estimates of the frequency may be based on the posterior probability density function described by a set of support samples with associated weights. Further, the YAAPT method may be a pitch tracking algorithm for tracking a single pitch. For instance, YAAPT may first transform the audio signal to the frequency domain spectral track, which may then be used to refine time-domain pitch candidates obtained using a Normalized Cross-Correlation. In addition, dynamic programming may be used to find the "best" pitch track among all the candidates. According to an example embodiment, 500 trials may be generated under each of the five SNR conditions. Alternatively, in another example embodiment, 250 trials may be generated for each mode (namely, the exercise and the still cases) using the estimated parameters of the autoregressive models. According to an example embodiment, three metrics may be used, namely, the root mean squared error ($R_{MSE}$), the error rate ($ER_{ATE}$), and the error count ($EC_{OUNT}$) defined as follows to evaluate the performance:

$$R_{MSE} = \sqrt{\frac{1}{T}\sum_{T=1}^{T}(\hat{f}_t - f_t)^2},$$

$$ER_{ATE} = \frac{1}{T}\sum_{t=1}^{T}|\hat{f}_t - f_t|/f_t,$$

$$EC_{OUNT} = |\{t: |\hat{f}_t - f_t|/f_t > \tau\}|.$$

In the above, $|\{\cdot\}|$ may denote the cardinality of a countable set, $\hat{f}_t$ and $f_t$ may be the frequency estimate and the ground-truth frequency at tth time frame respectively, and $\tau$ may be selected to be 0.03 empirically determined from the spread of the frequency components.

Figure 6A:
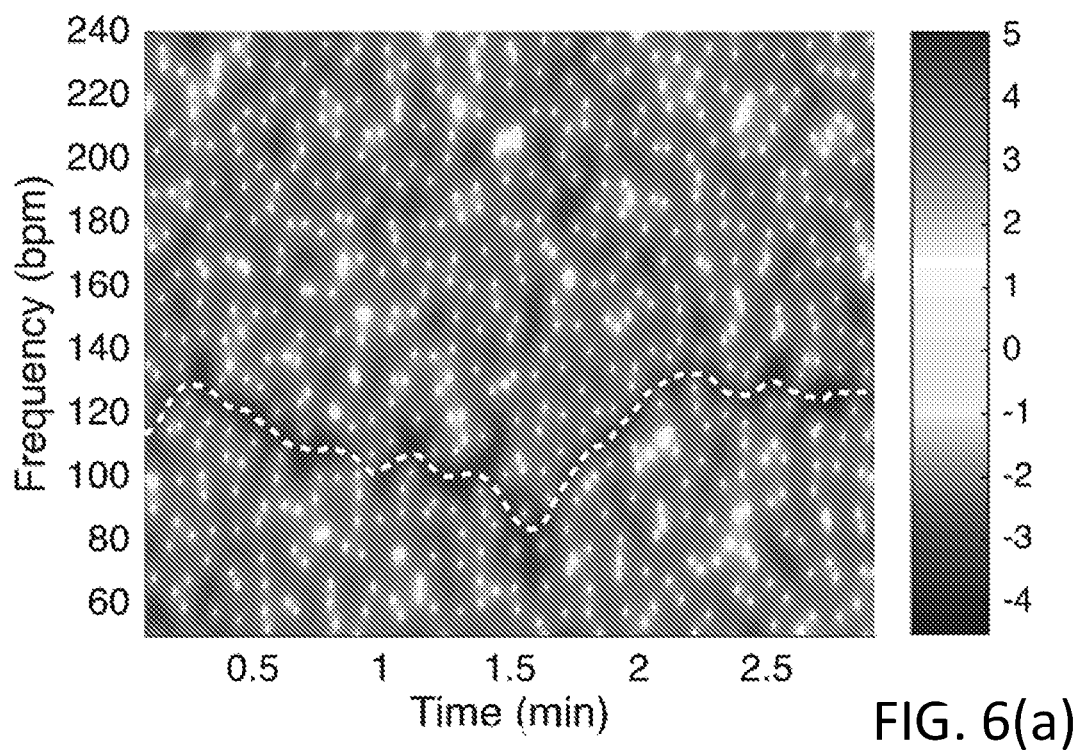
FIG. 6(a) illustrates a spectrogram of a synthetic −10 dB signal with one frequency component, according to an example embodiment.
Figure 6B:
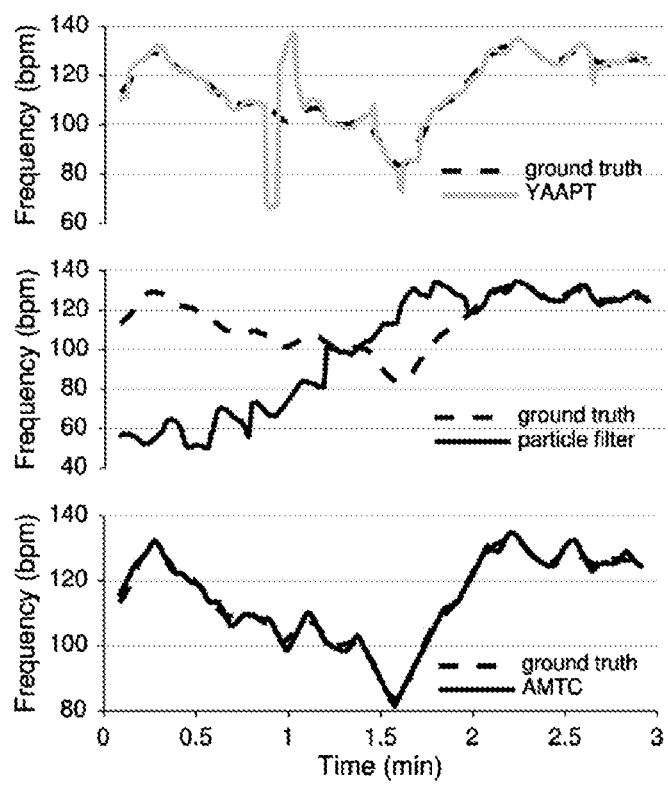
FIG. 6(b) illustrates the trace tracking results by yet another algorithm for pitch tracking (YAAPT), article filter, and offline AMTC, respectively, according to an example embodiment.

FIGS. 6(a) and 6(b) illustrate the tracking results of a −10 dB synthetic signal with one frequency component using AMTC, YAAPT, and particle filter, respectively, according to an example embodiment. In particular, FIG. 6(a) illustrates a spectrogram of a synthetic −10 dB signal with one frequency component, and FIG. 6(b) illustrates trace tracking results by YAAPT, particle filter, and offline AMTC, respectively. In this example, AMTC may output the best trace estimate among the three without much deviation from the ground truth.

Figure 7:
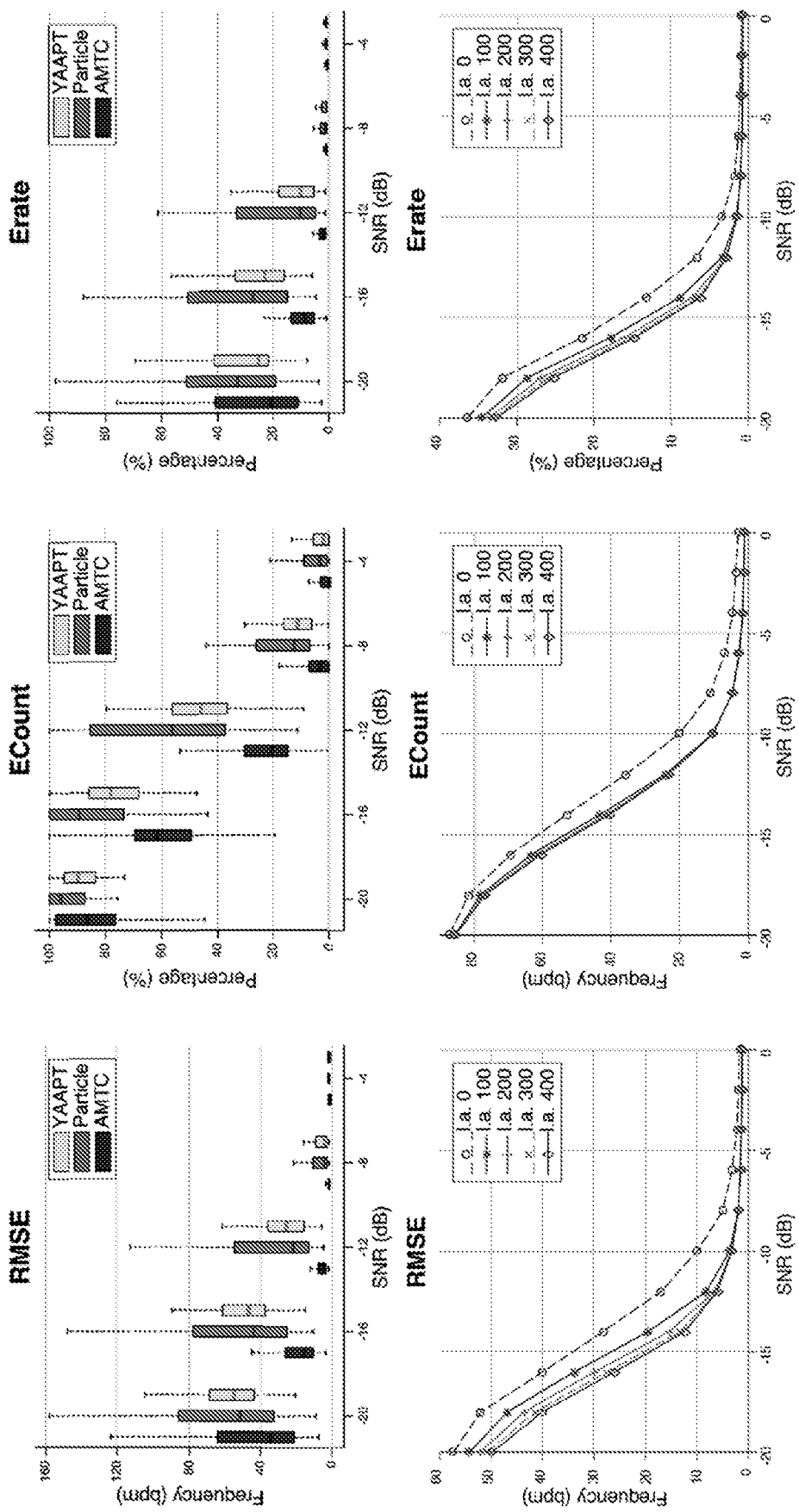
FIG. 7 illustrates the results of tracking performed on a synthetic signal, according to an example embodiment.

FIG. 7 illustrates the results of tracking performed on a synthetic signal, according to an example embodiment. For example, the first row in FIG. 7 illustrates results of a comparison of the performance of a single trace tracking by the AMTC, particle filter, and YAAPT methods at different levels of SNR. Statistics of the RMSE, the ECount, and ERate of frequency estimates may be summarized using the box plot. Additionally, the second row of FIG. 7 illustrates RMSE, ECount, and ERate for trace estimation by AMTC with different levels of look-ahead window lengths and SNR. As noted above, the results of the overall performance of the single trace tracking is illustrated in the first row of FIG. 7 in terms of box plots. In particular, each box compactly shows the median, upper and lower quantiles, and the max and min values of a dataset. The box plots also illustrate that under all SNR levels, AMTC generally outperforms the particle filter method and the YAAPT not only in terms of the average, but also in the variance of the error statistics.

As further illustrated in FIGS. 6 and 7, the online AMTC algorithm may be tested using different look-ahead time lengths. According to an embodiment, the evaluation may be performed using the same setting mentioned above, and the average behavior of each look-ahead length is plotted on the second row of FIG. 7. The numbers in the legends of the second row indicate the lengths of look-ahead (1.a.) window lengths represented by the number of time bins in the spectrogram.

From the plots in the second row of FIG. 7, a performance jump from no-look-ahead versus 100-bin look-ahead length may be observed. However, the performance saturates after further increasing the length. This observation may coincide with the intuition that a small look-ahead length may cause the online trace estimator to find a locally optimum solution. Further, given the shape of the curve, the performance may saturate starting from SNR=10 dB and may almost be identical among different levels of look-ahead length. This may be expected as the signal quality is high enough for AMTC to track the correct trace.

According to certain example embodiments, with multiple traces, the performance of the offline and online AMTC may be evaluated using simulated data in the presence of multiple traces. In addition, a comparison may be made with the fHMM method. To allow a fair comparison between the methods, a performance measure may be adopted.

In an example embodiment, both algorithms may be tested by generating a corrupted frequency signal s[n] with two frequency traces (i.e., $$s[n] = \sum_{l=1}^{2} \sin\Phi_l[n] + \epsilon[n].$$

According to an embodiment, the variance of $\epsilon[n]$ may be tuned to achieve six SNR levels from 0 to −10 dB. According to another embodiment, to cope with the high computation cost associated with running fHMM at a full scale, signals may be cut to 1 minute, the number of frequency bins may be set to 64, and the neighboring frequency bins may be made 1 bpm apart. In addition, the cardinality of frequency state may be set to 169 to uniformly cover the whole frequency range of interest. Further, in an embodiment, for each trace, a 20 second unvoiced segment may be introduced.

According to an embodiment, the GMM parameters of the fHMM framework may be estimated using an expectation-maximization EM algorithm. For instance, an EM algorithm may be an iterative method to find the maximum likelihood or maximum a posteriori (MAP) estimates of parameters in statistical models, where the model may depend on unobserved latent variables. Further, for each SNR level, 6,000 spectrum frames may be generated with a single frequency component for each 169 frequency states (where the first state encodes unvoiced decision). In addition, the maximum number of components per GMM may be set to 20, and minimum description length (MDL) may be used to determine the number of components automatically. In certain example embodiments, the MDL principle may correspond to a formalization of Occam's razor in which the best hypothesis (a model and its parameters) for a given set of data may be the one that leads to the best compression of the data. The parameters may be trained in an SNR-dependent (SD) and an SNR-independent (SI) fashion (i.e., each SD model may be trained only with samples of the corresponding SNR, and the SI model may be trained with all samples). In an example embodiment, a mixture-maximization interaction model may be adopted, and the prior distribution for both fHMM and AMTC may be uniformly set as $P(f_t(1)=m)=1/169$, $\forall m$, and the transition probability may follow a uniform distribution with a width parameter k=2. In addition, the voiced to unvoiced transition probability for fHMM may be empirically selected as P(voiced|unvoiced)=0.2, and P(unvoiced|voiced)=0.1.

According to an example embodiment, the tracking performance may be compared with an error measure. For instance, $E_{ij}$ corresponds to a percentage of time frames where i frequency components are misclassified as j. In addition, $E_{Gross}$ corresponds to a percentage of frames where $\exists l$, s.t. $\Delta f_l > 20\%$. In an embodiment, the relative frequency deviation $$\Delta f_i \stackrel{\Delta}{=} \min_i \frac{f_i^* - f_1}{f_1},$$

and $f_l$ is the reference frequency for the lth component. Further, $E_{fine}^l$ corresponds to the average relative frequency deviation from the reference of the lth frequency component for those frames where $\forall l$, $\Delta f_l \leq 20\%$. In certain embodiments, both $E_{ij}$ and $E_{Gross}$ may represent a frame counting measure. Thus, $E_{ij}$ and $E_{Gross}$ may be grouped together to form the total gross error: $E_{Total} = E_{01} + E_{02} + E_{10} + E_{12} + E_{20} + E_{21} E_{Gross}$, and define $E_{fine} = E_{fine}^1 + E_{fine}^2$.

To test the performance, in one example embodiment, 30 test instances may be generated for each SNR level using the same setting mentioned above. According to another embodiment, the performance of SD-fHMM, SI-fHMM, offline-AMTC, and online-AMTC using the aforementioned error measures and the results are listed in Table I. In addition, the distribution of $E_{Total}$ and $E_{fine}$ are illustrated in FIG. 7. Specifically, FIG. 7 illustrates box plots of $E_{Total}$ (left) and $E_{fine}$ (right) of two traces tracking using SD-fHMM, offline-AMTC, and online-AMTC on different levels of SNR, according to an embodiment.

TABLE I

| AVERAGE PERFORMANCE OF FHMM AND AMTC ON MULTI-TRACE TRACKING TEST | | | | | | | | |
|---|---|---|---|---|---|---|---|---|
| Method | $E_{01}$ | $E_{02}$ | $E_{10}$ | $E_{12}$ | $E_{20}$ | $E_{21}$ | $E_{Gross}$ | $E_{Total}$ | $E_{fine}$ |
| SD-fHMM | 4.14% | 1.62% | 0.36% | 15.39% | 0.28% | 1.78% | 0.02% | 23.59% | 1.79% |
| SI-fHMM | 3.48% | 1.52% | 0.61% | 14.37% | 0.29% | 2.38% | 0.03% | 22.68% | 1.82% |
| offine-AMTC | 1.77% | 0.28% | 3.57% | 2.16% | 0.45% | 9.99% | 0.03% | 18.27% | 1.76% |
| online-AMTC | 1.75% | 0.38% | 3.17% | 2.65% | 0.48% | 8.41% | 0.03% | 16.87% | 1.80% |

In certain example embodiments, all of the methods (e.g., SD-fHMM, offline-AMTC, and online-AMTC) may have a similar performance in terms of the fine detection error $E_{fine}$, while AMTC slight outperforms fHMM in terms of $E_{Total}$, the main contributors of which may be $E_{12}$ and $E_{21}$. Table II shows the average computation time in seconds per 100 frames. In particular, Table II shows the average computation time for a mixture-maximization (MIMAX) likelihood estimation procedure, together with the tracking time requirement. According to an example embodiment, the MIMAX model may be a probabilistic mixture model to describe for a frame (the short term spectrum) of speech to be used in speech recognition. According to an example embodiment, the preprocessing stage of fHMM to compute the emission probability may consume almost 0.4 sec/frame for the SD model and 2.0 sec/frame for SI model, which make the real-time implementation almost impossible for a usual hardware setting. On the other hand, in an example embodiment, AMTC may be more computationally efficient than fHMM, even without considering the mimax likelihood computing. For this task, online-AMTC may exhibit similar performance compared with the offline version at 4.4 msec/frame. According to an example embodiment, this may guarantee real-time adaptation with almost no performance drop.

TABLE II

AVERAGE COMPUTATION TIME
IN SECONDS PER 100 FRAMES

| Method | mixmax likelihood (sec) | Tracking (sec) |
| --- | --- | --- |
| SD-fHMM | 39.47 | 3.96 |
| SI-fHMM | 195.86 | 4.30 |
| offline-AMTC | N/A | 0.10 |
| online-AMTC | N/A | 0.44 |

Figure 8:
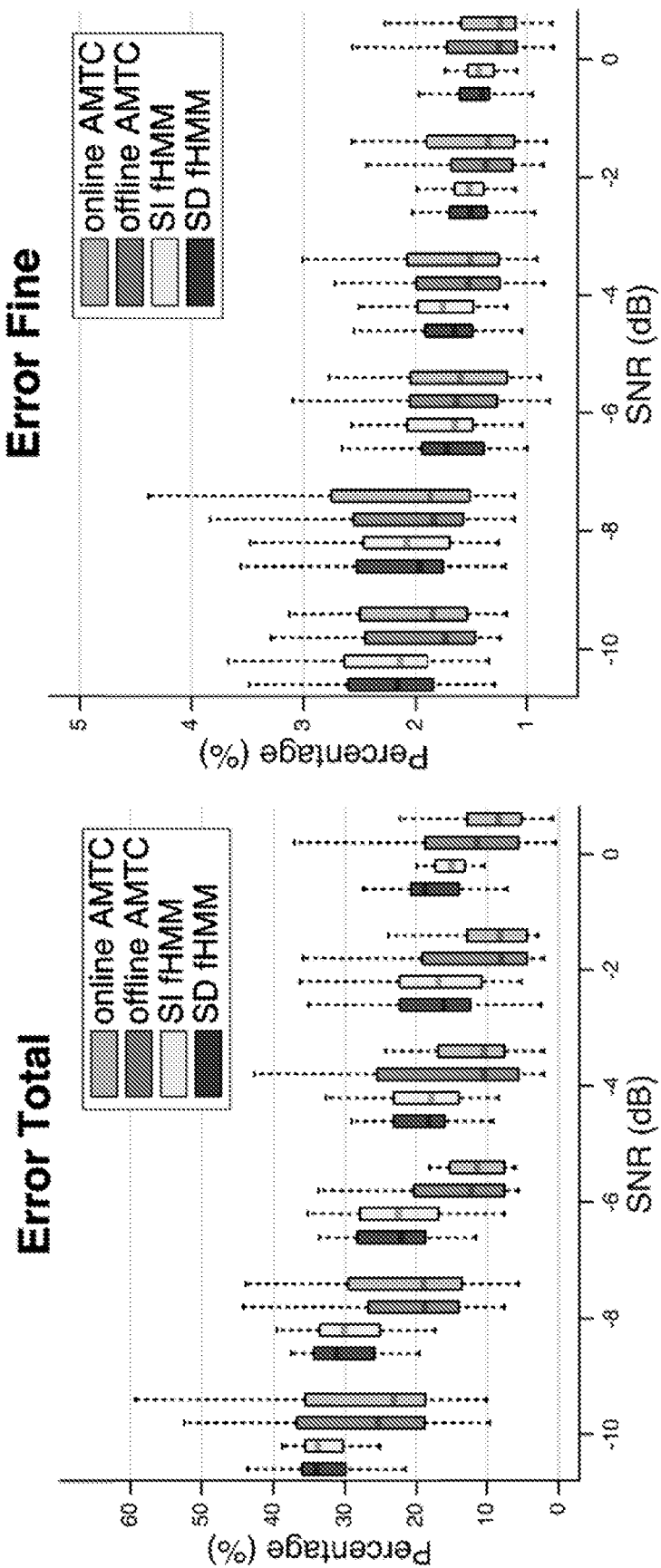
FIG. 8 illustrates box plots of $E_{Total}$ (left) and $E_{fine}$ (right) of two traces tracking, according to an example embodiment.

FIG. 8 illustrates the box plots of $E_{Total}$ (left) and $E_{fine}$ (right) of two traces tracking, according to an example embodiment. For instance, FIG. 8 illustrates box plots of two traces tracking using SD-fHMM, offline-AMTC, and online-AMTC on different levels of SNR.

Figure 9:
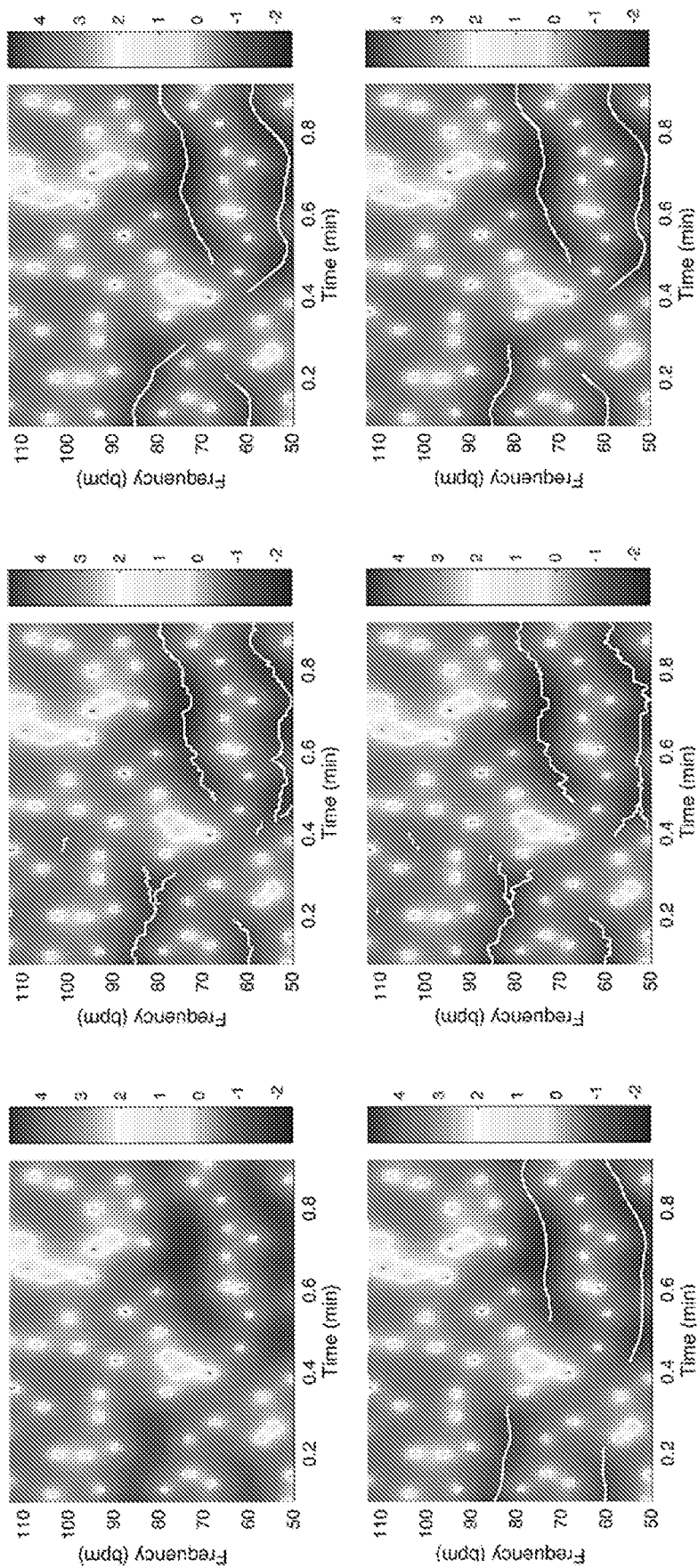
FIG. 9 illustrates the experimental results of the AMTC algorithm and factorial hidden Markov model, according to an example embodiment.

FIG. 9 illustrates the experimental results of the AMTC algorithm and fHMM, according to an embodiment. In particular, FIG. 9 illustrates experimental results of the AMTC algorithm and fHMM on a test signal with SNR=−8 dB. As illustrated in FIG. 9, in a low SNR environment, the performances of online and offline AMTC are better than the fHMM algorithm in terms of accuracy and false positive detections. In FIG. 9, the first column illustrates a spectrogram of one test instance with SNR=−8 dB (top) overlaid by ground truth traces (bottom). In addition, the second column in FIG. 9 illustrates SD-fHMM (top) and SI-fHMM (bottom) tracking results. Further, the third column in FIG. 9 illustrates offline-AMTC (top) and online-AMTC (bottom) tracking results.

Figure 10B:
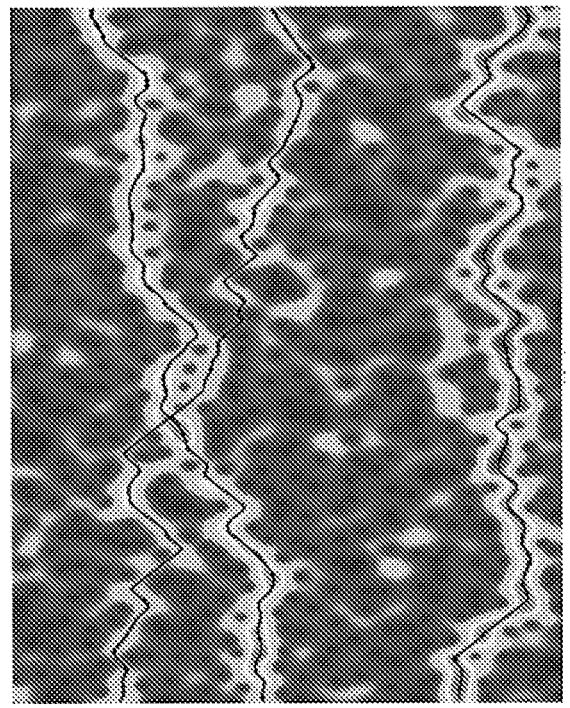
FIG. 10(b) illustrates a spectrogram of tracking performance, according to an example embodiment.
Figure 10A:
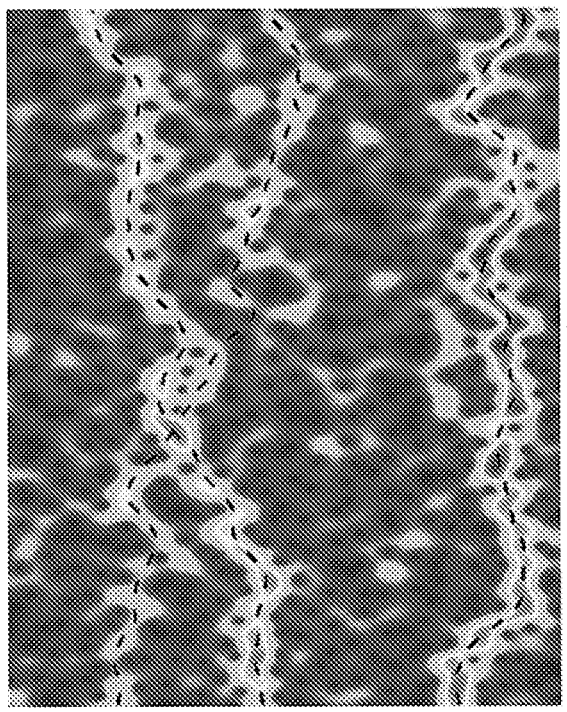
FIG. 10(a) illustrates a spectrogram of a synthetic signal, according to an example embodiment.

FIG. 10(a) illustrates a spectrogram of a synthetic signal, according to an example embodiment. Further, FIG. 10(b) illustrates a spectrogram of tracking performance, according to an example embodiment. For instance, FIG. 10(a) illustrates ground truth frequency traces at −10 dB in a spectrogram of a synthetic signal. In addition, FIG. 10(b) illustrates an example of tracking the performance of offline-AMTC when SNR is −10 dB, and three traces. As illustrated in FIG. 10(b), three traces have been accurately estimated as compared to the ground truth in FIG. 10(a) when two weak traces with different levels of strength intersect.

According to certain embodiments, experimental results on rPPG data may be obtained. For example, in certain embodiments, the performance of the AMTC algorithm on real-world data from a problem in heart rate estimation from facial videos may be obtained. In an embodiment, heart pulse variation may be estimated in a fitness setting by the rPPG method. According to an example embodiment, a total of 20 video may be collected. Of the 20 videos, 10 may contain human motions on an elliptical machine, and the other 10 may contain motions on a treadmill. Further, each video may be about 3 minutes in length in order to cover various stages of fitness exercise. In addition, each video may be captured in front of the face by a commodity mobile camera or other portable camera that can be affixed on a tripod or held by the hands of a person other than the subject.

In an embodiment, the heart rate of the test subject may be simultaneously monitored by an electrocardiogram (ECG)-based chest belt for reference. The spectrogram of the preprocessed face color feature may be estimated using the same set of parameters as described above with regard to simulation results and comparison with known ground truth. For each spectrogram, the traces induced by the subject motions dominate the heart rate trace.

Figure 11B:
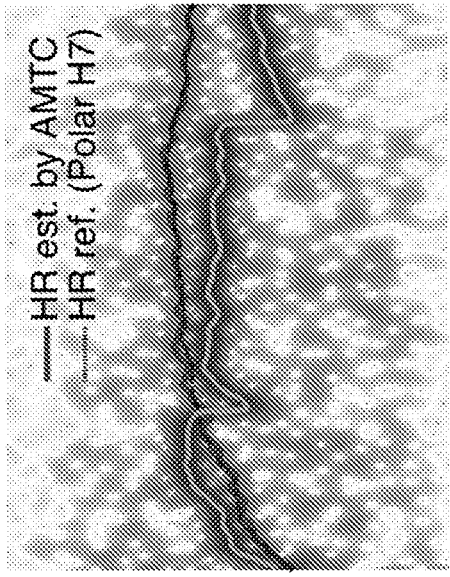
FIG. 11(b) illustrates another tracking result of using AMTC with uniform Markov transition probability model, according to an example embodiment.
Figure 11A:
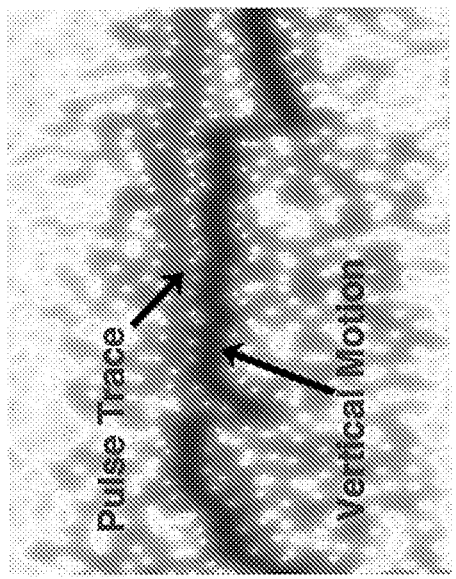
FIG. 11(a) illustrates a tracking result of using AMTC with uniform Markov transition probability model, according to an example embodiment.
Figure 11C:
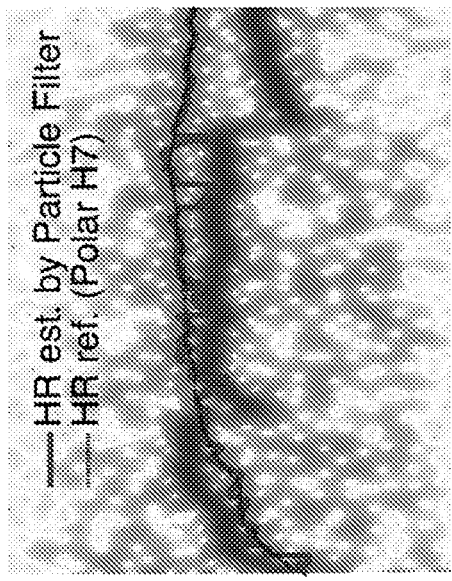
FIG. 11(c) illustrates a further tracking result of using AMTC with uniform Markov transition probability model, according to an example embodiment.

FIG. 11(a)-(c) illustrate an example of the tracking result using AMTC with uniform Markov transition probability model, according to an example embodiment. For instance, illustrates FIGS. 11(a)-(c) illustrate an example of the tracking result using AMTC with uniform Markov transition probability model with k=60 for the first motion-induced trace estimate, and with k=2 for the second pulse-induced trace estimate. In particular, FIG. 11(a) illustrates a weak heart pulse embedded in a strong trace induced by vertical motion. Further, FIG. 11(b) illustrates a heart rate estimation after compensating a first trace estimate using AMTC, and FIG. 11(c) illustrates a heart rate estimation using motion spectrogram notching and a particle filter method.

According to an embodiment, more freedom of trace dynamic (k=60) may be assigned to the first estimate as the variation of motion frequency may be much greater than heart rate. Compared to the particle filter-based method that utilizes additional information to compensate the motion trace, AMTC may faithfully track the dominating motion race, and recognize the HR trace as the second trace.

As illustrated in FIGS. 11(a)-11(c), the trace estimate from the particle filter may occasionally deviate to vertical motion trace due to diffused motion trace energy. A summary of the mean $\hat{\mu}$ and the standard deviation $\hat{\sigma}$ of the error measures for all of the videos and the results are listed in Table III. In addition, according to certain embodiments, the average error for AMTC may be 2.11 bpm in $R_{MSE}$ and 1.02% in relative error. Further, the performance of AMTC may be more than twice as good against the state-of-the-art motion notching+particle filter.

According to certain example, results on ENF data may be obtained. For example, in an embodiment, the performance of the AMTC algorithm on a real-world ENF dataset may be obtained. In particular, a total of 27 pairs of one-hour power grid signals and audio signals from a variety of locations may be collected and tested. In certain embodiments, each pair of signals may be simultaneously recorded using a battery powered voice recording device at a sampling rate of 44.1 kHz in MP3 format at 256 kps. In addition, the signals may be downsampled to 1 kHz to reduce the computational load, and harmonic combining may be applied to the signals to obtain robust frequency strips around the nominal frequency (e.g., 60 Hz). In an example embodiment, harmonic combining may correspond to a spectrum combining approach, which exploits the presence of the signal around different harmonics of the nominal frequency. In addition, the signal may be estimated by combining the frequency information at multiple harmonics, based on the local signal-to-noise ratio at each harmonic. Further, the ground truth may be obtained from the corresponding power grid signals using quadratic interpolation (QI), as the SNR may be high and frame-wise highest peak method may be the maximum likelihood estimator of signal frequency. In an example embodiment, $R_{MSE}$ and Pearson correlation coefficient ρ of the estimated versus ground-truth sequence of frequency variations as two performance indices.

FIGS. 12(a)-12(f) illustrate a tracking example, according to an example embodiment. For instance, FIG. 12(a) illustrates a spectrogram for a sample ENF audio signal, and FIG. 12(b) illustrates a ground truth frequency overlaid version of the sample ENF audio signal. In addition, FIG. 12(c) illustrates trace estimates returned by offline-AMTC, FIG. 12(d) illustrates trace estimates returned by a particle filter, FIG. 12(e) illustrates trace estimates returned by YAAPT, and FIG. 12(f) illustrates trace estimates returned by a quadratic interpolation.

Additionally, FIGS. 12(a)-12(f) illustrate a tracking example using a piece of audio signal captured in a time frame of about one hour. According to an example embodiment, the ENF trace may become weak after a period of time such as after about 15 minutes, which may be defined as a checkpoint. In addition, AMTC may identify the trace from the noisy harmonic combined spectrum feature, and the particle filter may provide comparable results before the checkpoint. However, the particle filter may occasionally deviate from the truth trace due to nearby interference, and the local peak based tracking method YAAPT and frame-wise frequency estimator QI may lose the target after the checkpoint as the peak information alone may not be able to guarantee good estimates.

In certain example embodiments, the performance of various methods are summarized in Table IV. According to an example embodiment, the mean and standard deviation of the error may be measured for 27 pieces of audio ENG signals. For this noisy dataset, AMTC may achieve 0.01 Hz in average $R_{MSE}$ and 0.85 in average correlation with ground truth, which substantially outperforms all other tracking methods both in average and in variance of the error statistics.

TABLE IV

PERFORMANCE OF VARIOUS METHODS ON ENF DATA

| Method | EMSE in Hz | | Pearson's ρ | |
| --- | --- | --- | --- | --- |
| | $\hat{\mu}$ | $\hat{\sigma}$ | $\hat{\mu}$ | $\hat{\sigma}$ |
| QI | 0.24 | 0.18 | 0.18 | 0.26 |
| Particle Filter | 0.04 | 0.07 | 0.55 | 0.37 |
| YAAPT | 0.16 | 0.12 | 0.23 | 0.28 |
| AMTC | 0.01 | 0.01 | 0.85 | 0.18 |

According to certain example embodiments, an estimation of the number of traces may be performed. For instance, as described herein, both the offline and the online AMTC algorithms may be presented with the assumption that the number of traces L is known. In some cases, L may be unknown and need to be estimated. In certain example embodiments, the process of estimating L in the AMTC system may be equivalent to determining the number of iterations AMTC needs to take. The problem may then be converted to deciding at which iteration should the AMTC stop. In an example embodiment, this problem may be solved by testing the hypothesis of the trace existence in the compensated spectrogram image $Z_{(l)}$ at each iteration l.

As previously described, certain embodiments may use RER measure to detect the existence of a trace in each frame. According to certain example embodiments, a low RER measure of a certain frame may suggest a low probability of the presence of a trace in that frame. Similarly, to globally test the trace existence at lth iteration of AMTC, it may be possible to evaluate the average of the statistics $RER_{(l)}$, namely, $$\overline{RER_{(l)}} = \frac{1}{N}\sum_{n=1}^{N} RER_{(l)}(n).$$

Figure 13B:
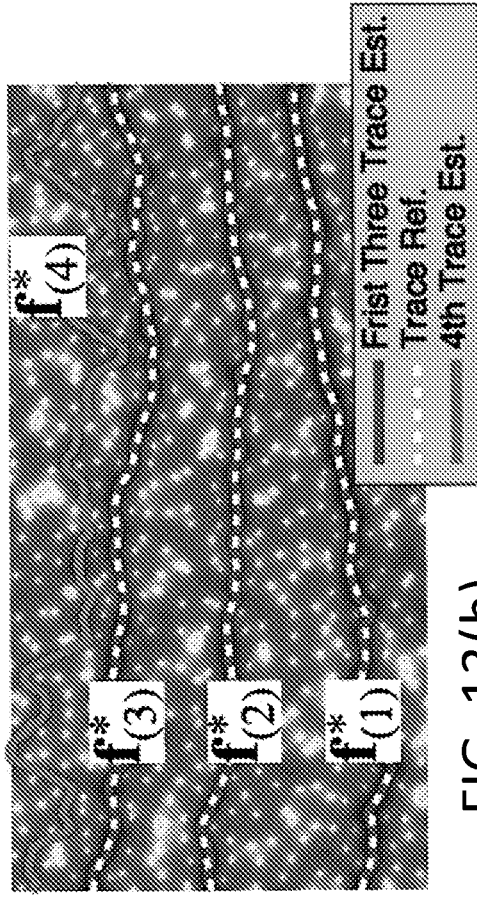
FIG. 13(b) illustrates the same image as FIG. 13(a) overlaid with ground truth frequency components and corresponding frequency estimates and additional trace estimates, according to an example embodiment.
Figure 13A:
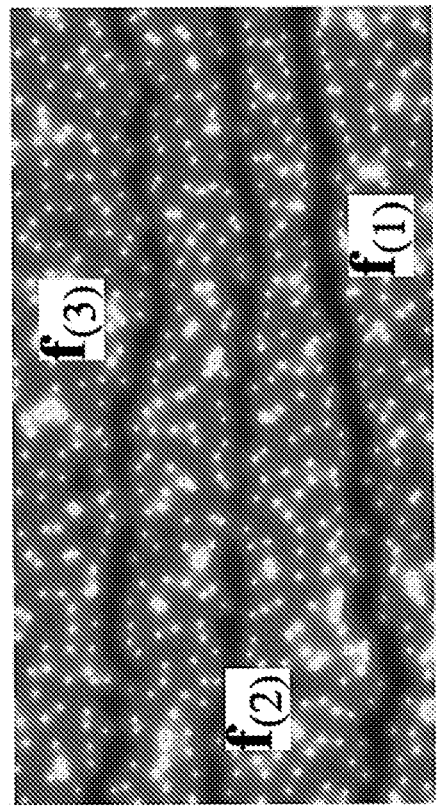
FIG. 13(a) illustrates a spectrogram image of a synthetic −8 dB signal with three frequency components, according to an example embodiment.
Figure 13C:
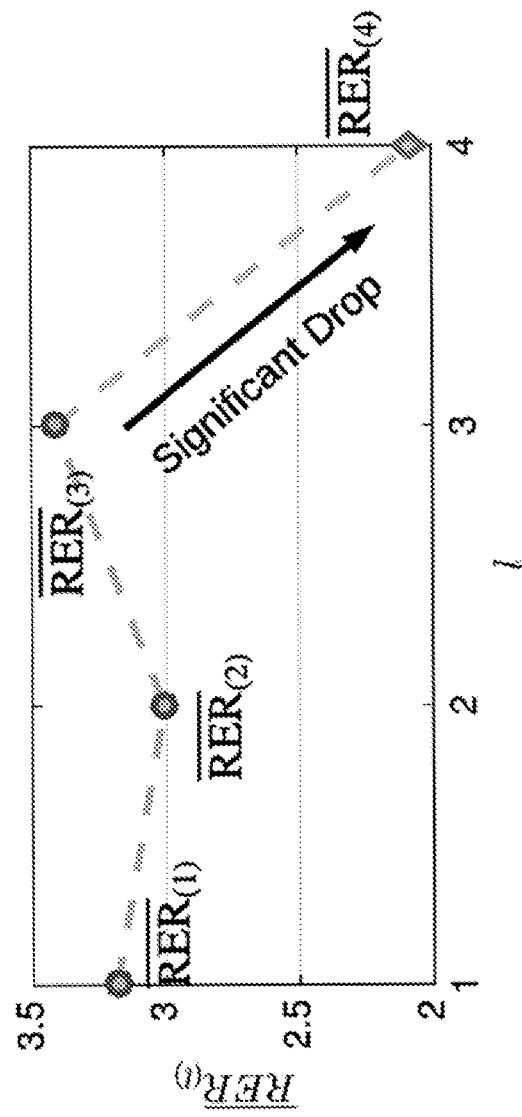
FIG. 13(c) illustrates a corresponding $\overline{RER}$ of all four trace estimates in FIG. 13(b), according to an example embodiment.

FIGS. 13(a)-13(c) illustrate an evaluation of the average of the statistics $RER_{(l)}$, according to an example embodiment. For instance, FIG. 13(a) illustrates a spectrogram image of a synthetic −8 dB signal with three frequency components, and FIG. 13(b) illustrates the same image as FIG. 13(a) overlaid with ground truth frequency components and corresponding frequency estimates and additional trace estimates. In addition, FIG. 13(c) illustrates a corresponding $\overline{RER}$ of all four trace estimates in FIG. 13(b). As illustrated in FIGS. 13(a)-13(c), the ground truth number of traces in the spectrogram image is 3. Further, as illustrated in FIG. 13(c), there exists a significant drop in $\overline{RER_{(l)}}$ from l=3 to l=4 when the offline AMTC is run with four iterations. This observation coincides with the actual absence of the fourth trace. Thus, in an example embodiment, L may be estimated as l−1 if at the lth iteration, $\overline{RER_{(l)}}$ is less than a preset threshold.

According to certain example embodiments, signals may have multiple harmonics. For example, in situations when multiple harmonic traces appear in the spectrogram (e.g., audio signals, Electrocardiography (ECG) signals), AMTC may extract several harmonic traces originated from one single source. In certain example embodiments, human speech signals may be used. In one example embodiment, the fundamental frequency range of interest, 85 Hz to 255 Hz, may cover both fundamental frequency components as well as second order harmonics. For instance, a peak in 200 Hz may be considered as the fundamental frequency component of a female speaker, or it may also represent the second-order harmonic of a male speaker. In this regard, the STFT spectrum feature may not be considered as a proper input of a robust fundamental frequency tracker. Instead, this problem may be addressed by introducing several alternative robust spectral features including, for example, the subharmonic summation method, the discrete logarithmic Fourier transform, and the frequency autocorrelation function. Similar to the idea of a harmonic combining algorithm, used for ENF cases, these methods may be capable of combining harmonic spectral features and improving the SNR of the fundamental frequency. In addition, the tracking performance may be expected to be better by feeding any of these three features rather than the STFT spectrogram.

Figure 14B:
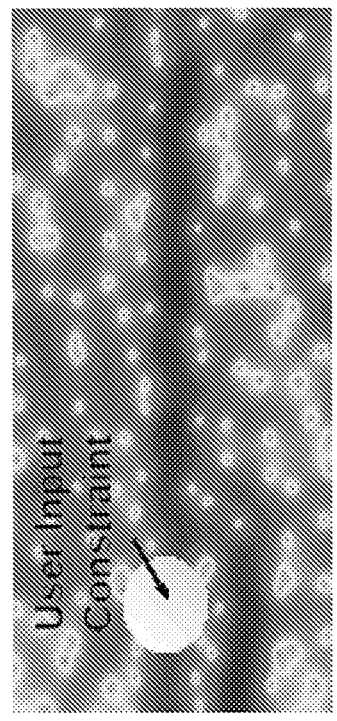
FIG. 14(b) illustrates a spectrogram of a user input constraint in a filled circle for the estimated trace to pass through, according to an example embodiment.
Figure 14A:
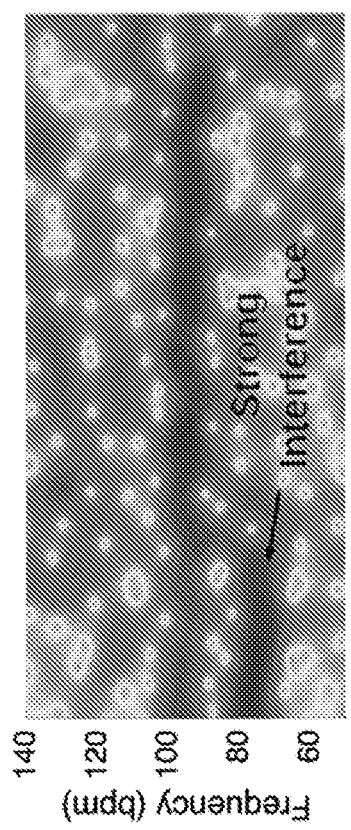
FIG. 14(a) illustrates a spectrogram of a synthesized signal with a ground truth frequency of about 95 bpm, and strong nearby interference from 0-0.4 min, according to an example embodiment.

FIGS. 14(a)-14 (d) illustrate various spectrograms, according to an example embodiment. As illustrated in FIGS. 14(a)-14(c), there may be certain benefits from human-in-the-loop interactions. Due to the greedy nature of the searching strategy in each iteration, the AMTC algorithm may find incorrect traces when nearby strong interference is presented, or two traces with similar energies run closely in time. For example, FIG. 14(a) illustrates a spectrogram of a synthesized signal with a ground truth frequency of about 95 bpm, and strong nearby interference from 0-0.4 min. FIG. 14(c) illustrates one such example where the AMTC may be confused when strong interference is presented near the ground truth frequency trace. For certain applications when analysis is performed offline and there is prior knowledge about the trace shape or part of the trace frequency range, it may be beneficial to allow users to input high-level cues to guide an estimator's priority to find the correct trace.

Figure 14D:
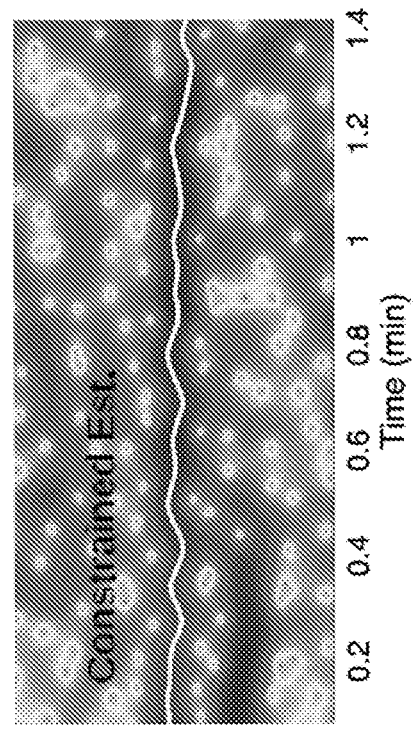
FIG. 14(d) illustrates a spectrogram where AMTC may correctly capture the true trace, according to an example embodiment.
Figure 14C:
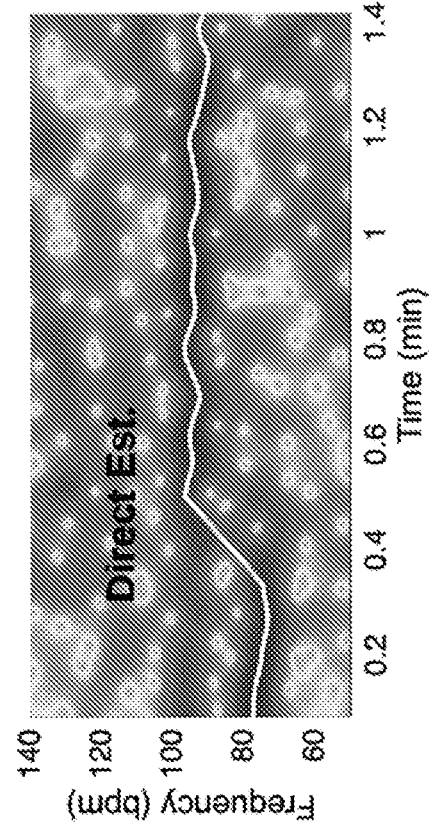
FIG. 14(c) illustrates a spectrogram where the AMTC may be confused when strong interference is presented near the ground truth frequency trace, according to an example embodiment.

For example, FIG. 14(b) illustrates a user input constraint in a filled circle for the estimated trace to pass through. In addition, FIG. 14(d) illustrates that AMTC may correctly capture the true trace by shifting its attention from interference to the user-defined region.

According to certain example embodiments, instantaneous frequency estimation may provide a fundamental task with many signal processing applications, and the accuracy of estimators may drop as signals become more corrupted. Thus, certain example embodiments may provide a learning-based approach using a convolutional neural network (CNN) to address the challenge of frequency tracking under very noisy conditions. In certain example embodiments, the network may be trained on synthetic signals of time-varying frequency and tested on experimentally collected signals such as ENF signals that are useful in various situations including, for example in information forensics. According to an example embodiment, the performance of the learning-based approach may be examined under different SNR scenarios, and certain results may show that certain embodiments may significantly outperform state-of-the-art methods under low SNR scenarios.

Figure 15:
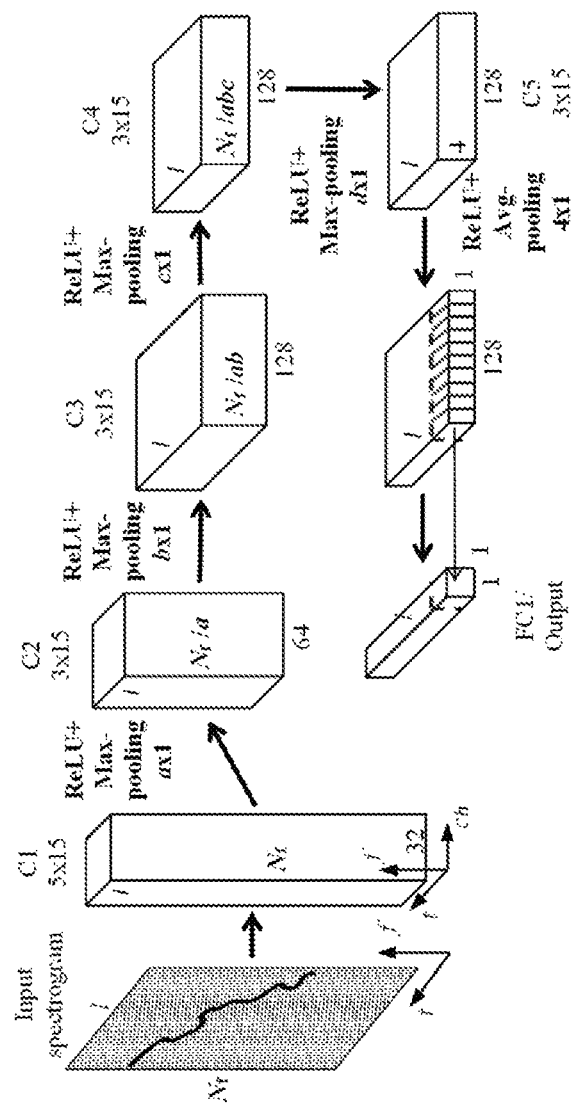
FIG. 15 illustrates a convolutional neural network (CNN) architecture, according to an example embodiment.

Certain example embodiments may provide a CNN architecture for extracting single-trace instantaneous frequency from spectrograms. FIG. 15 illustrates a CNN architecture, according to an example embodiment. For instance, FIG. 15 illustrates a CNN architecture where the axes f, t, and ch are frequency, time, and channel, respectively. Further, the size of the input spectrogram may be represented as $N_f$-by-l. In an example embodiment, the input may be the signal spectrogram and the output may be the normalized frequency vector, whose entry is calculated by $y_i = (f_i - f_{min})/(f_{max} - f_{min})$, where $f_i$ is the ith entry of the ground truth frequency vector, and $f_{min}$ and $f_{max}$ are the lowest and highest frequencies of the spectrogram strip. According to an example embodiment, the length of the output vector may be identical to the time duration of the input spectrogram. Further, as illustrated in FIG. 15, the CNN may include five convolutional layers C1 to C5, five pooling layers, and one fully connected layer FC1. In an example embodiment, rectified linear units (ReLU) activation function, $f(x) = \max(0, x)$, may be applied after each convolution layer and fully connected layer.

According to an example embodiment, the number of channels in the layer may increase as the network goes deeper. Further, an example embodiment may provide a heterogeneous CNN model in the two dimensions of the data frames. In addition, the output of each convolutional layer (i.e., feature map) may be downsampled only in the frequency dimension in the pooling layers while keeping the time dimension intact to avoid the loss of the time resolution. In an example embodiment, the spectrogram of a time-varying frequency signal with a size of $N_f$-by-l may represent the input image. In a further example embodiment, the size may be selected to be 64-by-64 for training. However, the trained CNN may estimate frequency from input spectrograms of any size in other embodiments.

According to an example embodiment, the CNN architecture may include convolutional layers. In a heterogeneous downsampling design of the CNN model, a filter size in the convolutional layers may be different in frequency and time. In addition, the filter length may be short in the frequency dimension, but set long in the time dimension since no downsampling may be applied in this dimension. According to an example embodiment, filter sizes may include 5×15, 3×15, 3×15, and 3×15 filters in the five convolutional layers, respectively.

In an example embodiment, the CNN architecture may also include pooling layers. For instance, the pooling layers may condense feature maps via downsampling, which may help extract features at different scales. According to certain example embodiments, the first four layers may be max pooling layers, and the last may be an average pooling layer. In an example embodiment, non-overlap pooling layers may be applied after each convolutional layer and downsample only the frequency dimension. In certain example embodiments, the pooling sizes may include a×1, b×1, c×1, d×1, 4×1, respectively. According to one example embodiment, (a, b, c, d)=(2, 2, 2, 2) may be selected when $N_f$=64; (a, b, c, d)=(4, 2, 2, 2) when $N_f$=128; and (a, b, c, d)=(4, 4, 2, 2) when $N_f$=256.

According to an example embodiment, the CNN architecture may further include fully connected layers. After ReLU and pooling in C5, a 2-D matrix with/neurons in the time dimension and 128 in the channel depth may be obtained. In an example embodiment, a fully connected layer may be constructed along the channel dimension after C5, and an l-dimension vector may be obtained representing the estimated frequency vector. According to an example embodiment, each entry of the vector may be the weighted sum of the neurons in the corresponding row of the matrix. As illustrated in FIG. 15, the neurons in the first row (i.e., the shaded part) may be involved in the calculation of the first entry.

In another example embodiment, the CNN architecture may be characterized with a loss function. For example, the loss function may be defined as $$\sum_{i=1}^{l} |y_i - x_i| + \gamma \sum_{i=1}^{l-1} \left\{ 1 - \exp\left[ -\frac{(x_{i+1} - x_i)^2}{2\sigma^2} \right] \right\} \quad (8)$$

In (8), $x_i$ and $y_i$ are the ith entry of the estimated frequency vector and the normalized ground truth frequency vector, respectively. In addition, $\gamma$ and $\sigma$ may be two parameters for regularization. Further, the first term may be $f_1$-norm error measuring the deviation between the estimated frequency and the ground truth. In an example embodiment, the regularization term may also control the smoothness of the estimated instantaneous frequency curve to avoid abrupt changes.

According to certain example embodiments, training may be performed on synthetic data. For example, the neural network may include a large set of data. However, it may be challenging to collect a large quantity of signals with time-varying frequency, different noise realizations, and their ground truth from real experiments. As such, certain example embodiments may construct a synthetic dataset to facilitate training.

In an example embodiment, the time-varying frequency $f_v$ may be modeled as a first order autoregression process. In addition, the signal may be synthesized by $$g(n) = \cos\left( 2\pi \frac{1}{f_s} \sum_{i=1}^{n} f_v(i) \right) \quad (9)$$

where $f_s$ is the sampling frequency.

According to an example embodiment, a portion of the signal with certain probability may be zeroed out to simulate practical scenarios, and then an additive white Gaussian noise (AWGN) may be added to the whole signal. After adding the AWGN, the spectrograms may be obtained and cropped to a frequency range in which most high-energy frequency components of the signals were located. In certain example embodiments, the size of the cropped strips may be 64-by-64, and the frequency range may be [0.5, 1.5] Hz.

Figures 16A, 16B:
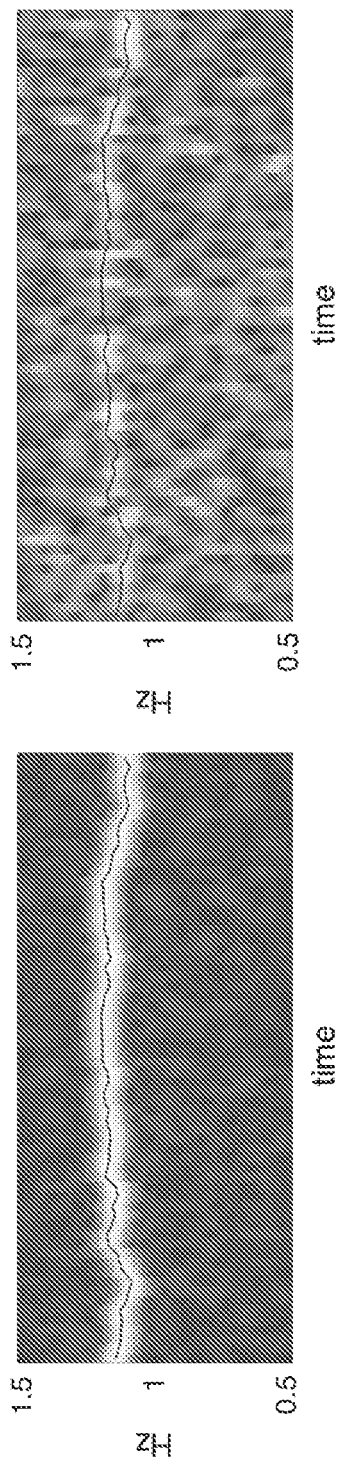
FIG. 16(a) illustrates synthetic spectrogram strips under a clean scenario, according to an example embodiment.
FIG. 16(b) illustrates synthetic spectrogram strips under a noisy scenario, according to an example embodiment.

FIGS. 16(a) and 16(b) illustrate two examples of synthetic spectrogram strips, according to an example embodiment. In particular, FIGS. 16(a) and 16(b) illustrate two examples of the synthetic spectrogram strips under clean and noisy scenarios, respectively, which are visually similar to the ones collected from real-world experiments illustrated in FIGS. 18(a) and 18(b). For instance, FIG. 16 illustrates two results on an ENF dataset with different methods. As illustrated in FIGS. 18(a) and 18(b), the curve in each strip represents the extracted instantaneous frequency curve using the corresponding methods specified by the leftmost column. Further, the ground truth may be obtained by frequency analysis from power grid recordings.

Referring to FIGS. 16(a) and 16(b), in certain example embodiments, 1024 synthetic signals may be generated with a zero-out probability of 50%. In addition, each signal may be corrupted with AWGN at eight SNR levels (i.e., 10, 5, 0, −2, −4, −6, −8, −10 dB), resulting in 8,096 spectrogram images in total. Furthermore, in another example embodiment, the CNNs may be implemented with MAT-CONVNET® toolbox by setting the parameters for the stochastic gradient descent as follows: momentum=0.9, weight decay=$5 \times 10^{-4}$, learning rate=$2 \times 10^{-4}$, and the batch size for training may be 32. However, according to certain example embodiments, other deep learning platforms may also be implemented aside from MATCONVNET® including, for example, TENSORFLOW® and PYTORCH®.

In certain example embodiments, the performance of the CNN may be tested along with other frequency estimation methods, and results on the synthetic data as well as a practical data, the ENF data may be obtained. Further, the root-mean-square error (RMSE) and Pearson coefficient ρ of the estimated versus the ground truth sequence of frequency variations as two performance indices may be used. The abbreviated names of the methods may include WEIGHTED, PF, MUSIC, IAA, CNN-HT (CNN-heterogeneous), and CNN-HM (CNN-homogeneous).

Specifically, WEIGHTED may refer to a weighted energy approach where the estimated frequency is the "centroid" of the frequency range of interest with the power spectrum as the density. Further, PF may refer to a particle filter algorithm applied on the spectrogram cropped within the frequency strip of interest. In addition, MUSIC may represent multiple signal classification. For instance, the number of frequency components may be set to 4, and the frequency peaks in the frequency strip of interest may be detected. As for IAA, this may represent an iterative adaptive approach where the number of iterations may be set to 10. Further, CNN-HT may represent the CNN illustrated in FIG. 15 with (1) as the loss function. In addition, CNN-HM may correspond to the same structure and loss function as in CNN-HT, but using square-size filters of a size of 5, 3, 3, 3, 3, respectively. In certain example embodiments, MUSIC may be a classical parametric spectrum estimation method, and IAA may be a state-of-the-art nonparametric adaptive estimation approach. According to an example embodiment, for comparison, a tracing module may be applied to these methods in order to enforce the smoothness constraint for the frequency along time.

According to certain example embodiments, experiments on synthetic testing data may be performed. For example, a synthetic testing dataset may be created using the procedures described above regarding training synthetic data. In one example embodiment, 1,024 signal segments may be generated, and AWGN may be added to each signal at the same eight SNR levels from 10 to −10 dB, to obtain a total of 8,096 signals. Different from the training data, the intervals in the testing data are not manually zeroed out. Rather, the testing signals were preprocessed to generate proper inputs to the various algorithms. For the spectrogram-based methods, the spectrograms of the signals of size 64×64 were obtained. Further, for the non-spectrogram based methods, the signal may be filtered to obtain a bandlimited signal within [0.5, 1.5] Hz, where the instantaneous frequency of synthetic signals may be confined.

Figure 17A:
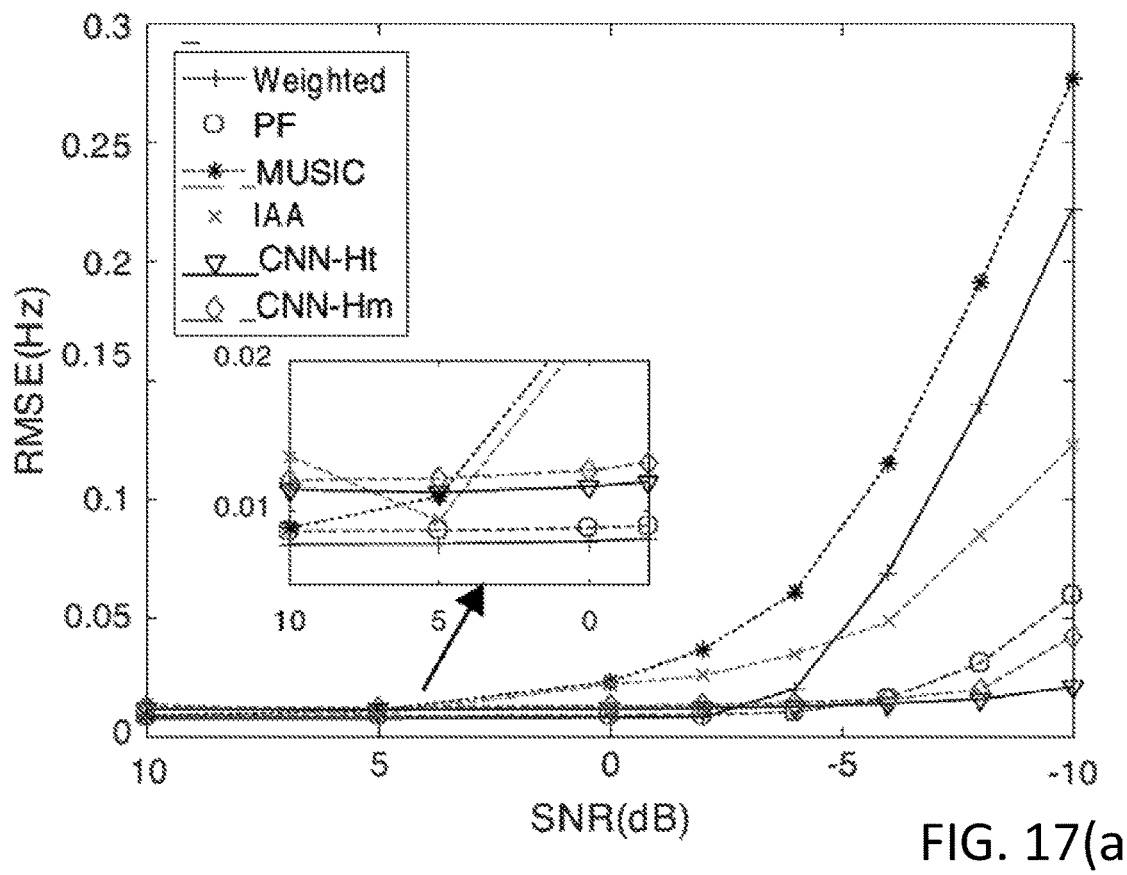
FIG. 17(a) illustrates the performance of different methods on synthetic data in root-mean-square-error, according to an example embodiment.
Figure 17B:
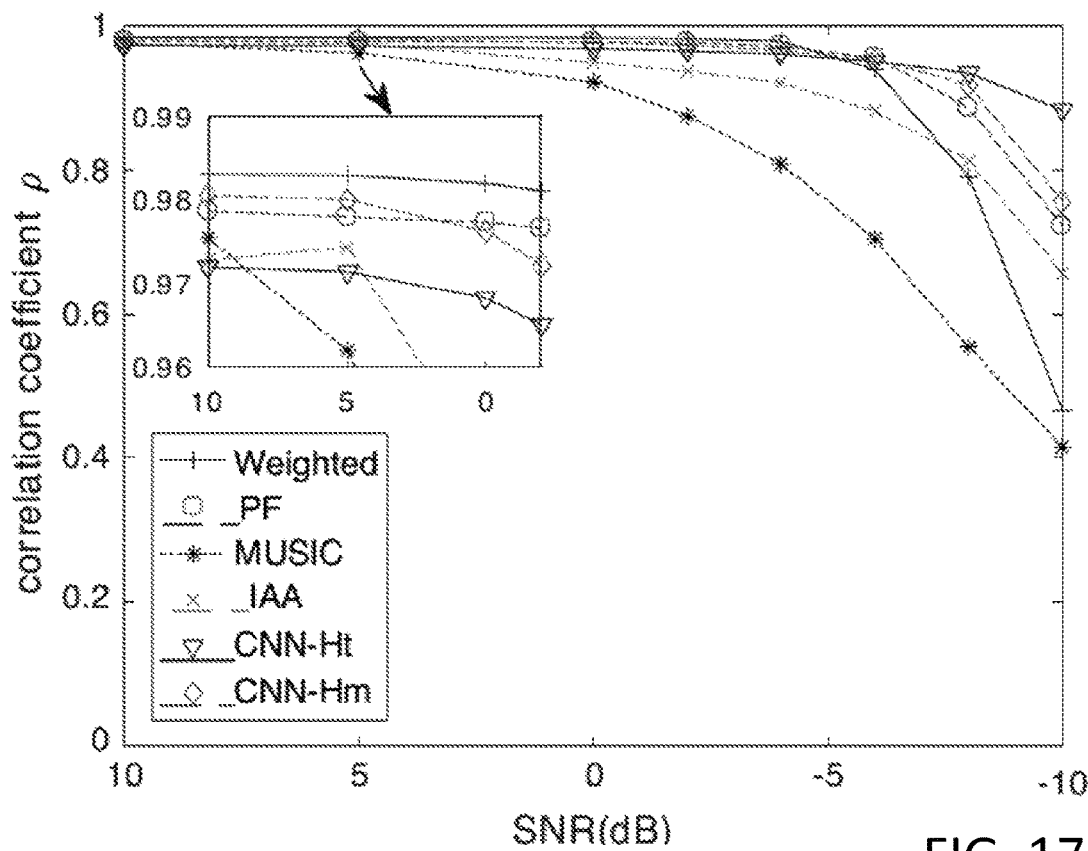
FIG. 17(b) illustrates the performance of different methods on synthetic data in a correlation coefficient, according to an example embodiment.

FIGS. 17(a) and 17(b) illustrate the effectiveness of the CNNs, according to an example embodiment. For instance, FIGS. 17(a) and 17(b) illustrate the performance of the six frequency estimation methods under eight SNR levels. FIGS. 17(a) and 17(b) illustrate the performance of different methods on synthetic data, and FIG. 17(a) specifically relates to RMSE, whereas FIG. 17(b) relates to a correlation coefficient. For Example, the CNNs may have comparable performances to other methods under high SNR scenarios, but have noticeable superiority under low SNR conditions (e.g., from 0 dB to −10 dB). In certain example embodiments, MUSIC and WEIGHTED may be most vulnerable to strong noise, whose performances may begin to drastically degrade at around 0 dB. Further, IAA and PF may be less sensitive to strong noise, but unable to compete CNNs. For two CNN approaches according to certain example embodiments, CNN-HT may obtain a better performance under low SNR scenarios, suggesting that the heterogeneous filter design may improve estimation accuracy. This may be because of the longer filters along time may take into account the spectra in a larger neighborhood.

According to certain example embodiments, the number of frequency bins $N_f$ may influence the performance of the CNN model. For instance, according to an embodiment, $N_f$ may be set to three different values: 64, 128, and 256. The inputs for different $N_f$ may include the strips with length $N_f$ in the frequency dimension, cropped from the spectrograms of the signals. Specifically, the frequency ranges for $N_f$=64, 128, and 256 may correspond to 0.5-1.5 Hz, 0-2 Hz, and 0-4 Hz, respectively. The result reveals that the performance of the CNN drops by less than 2% in correlation for $N_f$ values from 64 to 256. As such, this may suggest that the performance of the CNN may not be susceptible to the choice of the frequency range of the spectrograms.

In certain example embodiments, experiments on real-world ENF data may be performed. For example, in one embodiment, 167 pairs of one-hour power grid signals and audio signals from a variety of locations may be obtained, and two signals in one pair may be simultaneously recorded. In an example embodiment, to reduce the computational load, the signals may be downsampled from 44.1 kHz to 1 kHz.

According to another example embodiment, the collected signals for different algorithms (e.g., WEIGHTED, PF, MUSIC, and IAA) may be preprocessed. For example, spectrum combining may be applied to the spectrogram based methods to obtain robust frequency strips around the nominal frequency (e.g., 60 Hz and 50 Hz). In an example embodiment, for the non-spectrogram based methods, the signal may be filtered to obtain the band-limited signal within the strongest harmonic subband. Following this, the ground truth from the corresponding recorded power grid signals using WEIGHTED may be obtained, and the results are shown in Table V.

TABLE V

THE PERFORMANCE ON ENF DATASET (AUDIO CLIPS)

| | RMSE (Hz) | p-value | correlation coefficient ρ | p-value |
|---|---|---|---|---|
| CNN-H$_T$ (Proposed) | 0.018 | — | 0.81 | — |
| CNN-H$_M$ (Alternative) | 0.024 | 0.001 | 0.77 | 0.014 |
| P$_F$ [3] | 0.020 | 0.049 | 0.74 | $10^{-4}$ |
| WEIGHTED [14] | 0.043 | $10^{-7}$ | 0.64 | $10^{-5}$ |
| I$_{AA}$ [7] | 0.028 | $10^{-5}$ | 0.73 | $10^{-4}$ |
| Music [5] | 0.087 | $10^{-31}$ | 0.26 | $10^{-51}$ |

According to an example embodiment, group means may be used to indicate the average behaviors of the methods and p-value from statistics to measure whether the current method has a significantly different performance from CNN-HT. Given that CNN-HT may have the best group mean, p-value≤0.05 may provide a good indicator that CNN-HT may be significantly better than the other method (e.g., WEIGHTED, PF, MUSIC, and IAA). Referring to Table V, it can be seen that the CNNs have the strongest performance in extracting ENF signals. WEIGHTED, PF, and IAA perform moderately well, while MUSIC performs the worst in such noisy situations. For two CNNs, CNN-HT significantly outweighs CNN-HM under both performance indices, suggesting that the longer filters along time benefit CNN-HT to model the temporal correlation of the frequency perturbation in signals.

As illustrated in FIGS. 18(a) and 18(b), some typical results in the ENF dataset may be visualized. In particular, these figures illustrate that CNN-HT gives desirable results in practical scenarios, whereas the other five methods may have the abrupt fluctuation or large deviation from the nominal frequency in the frequency estimation under occasionally large noise, such as in the middle part of FIG. 18(b). In certain example embodiments, the best performance of CNN-HT in the low SNR scenarios may indicate its stronger resistance to noise, as well as its ability to learn the temporal correlation of the perturbation in ENF. However, in certain embodiments, failure may occur in the CNN trained for single-trace frequency tracking when another strong frequency component exists within the nominal frequency strip (e.g., some parts in FIG. 18(a)). Further, multi-traces may confuse the CNN since it is designed to estimate the frequency of the signals with one time-varying frequency.

With the CNN of certain example embodiments, it may be possible to estimate the frequency using a complex and nonlinear function of the input spectrogram or signal, namely, $\hat{f}_{cnn} = \mathcal{F}_C(S)$ or $\hat{f}_{cnn} = \tilde{\mathcal{F}}_C(x)$. This nonlinear function may be inferred from ground truth signals in such a way that the other approaches do not directly do.

According to an example embodiment, the WEIGHTED method may estimate the frequency by weighting the elements of periodogram (i.e., $$\hat{f}_{weighted} = \frac{f^T}{1^T p} p$$

where f is the frequency vector and p is the periodogram of the current frame (i.e., a column of S). In addition, the WEIGHTED estimator may be a linear estimator of the spectrogram and, thus, have limited capability to handle complex distortions.

In an example embodiment, the PF method may estimate the frequency by modeling the probability distribution of frequency in one frame via the distribution of particles. For instance, it may first make an initial prediction about the distribution of particles in the current frame under a Markovian assumption, and then update the distribution using new periodogram observation for the current frame. Thus, PF may effectively estimate the frequency using a short time span, whereas CNN-HT utilizes heterogeneous filters with a longer span along time to produce more accurate results.

According to an example embodiment, the MUSIC method may model a signal as sinusoids plus additive noise, and may estimate the frequency $\hat{f}_{music} = \arg\min_f \|\hat{V}e(f)\|^2$, where $e(f)$ is a complex exponential vector at frequency $f$ and the columns of $\hat{V}$ span the estimated noise subspace. The estimated noise subspace may be composed of deterministic linear functions of the input signal x. Thus, MUSIC may be thought as a quadratic function of x, and may be simpler than CNN-HT. However, MUSIC may also suffer from the real signals deviating from the assumed sinusoid model, and a poorly estimated noise subspace.

In an example embodiment, the IAA method may estimate the spectrum by iteratively applying the generalized least-squares with the gradually fine-tuned interference and noise covariance matrix. According to an example embodiment, this algorithm may be time consuming due to iteratively inverting large covariance matrices of order N, where N is a signal length of the current frame. In comparison, the CNN may produce more accurate estimates in a much shorter time.

Figure 19:
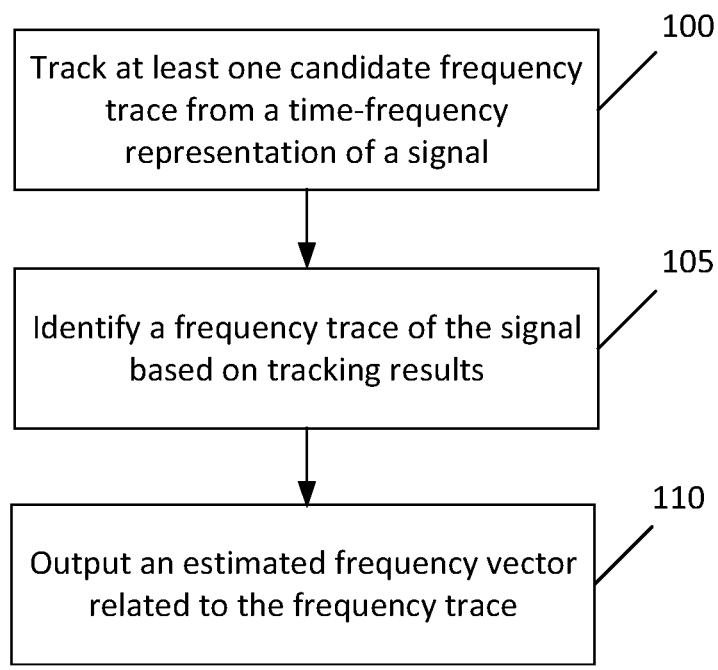
FIG. 19 illustrates an example flow diagram of a method, according to an example embodiment.

FIG. 19 illustrates an example flow diagram of a method, according to an example embodiment. In certain example embodiments, the flow diagram of FIG. 19 may be performed by a computer, computer system, or an embedded system, for instance similar to apparatus 10 illustrated in FIG. 22. According to one example embodiment, the method of FIG. 19 may include initially, at 100, tracking at least one candidate frequency trace from a time-frequency representation of a signal. The method may also include, at 105, identifying a frequency trace of the signal based on tracking results. The method may further include, at 110, outputting an estimated frequency vector related to the frequency trace. In an example embodiment, the tracking may be performed under a noisy condition environment.

In an example embodiment, the tracking, identifying, and outputting may be performed via a convolutional neural network or a multiple frequency traces tracking and detection procedure. In another example embodiment, the convolutional neural network may include a plurality of convolutional layers, a plurality of pooling layers, and at least one fully connected layer. According to an example embodiment, each of the plurality of convolutional layers may include a different filter size in frequency and in time. According to another example embodiment, the plurality of pooling layers comprises a combination of maxpooling layers and an average pooling layer. According to a further example embodiment, the method may also include applying a rectified linear units activation function after each of the plurality of convolutional layers and the at least one fully connected layer. In an example embodiment, the multiple frequency traces tracking and detection procedure may include an iterative dynamic programming application and an adaptive trace compensation application.

In another example embodiment, the iterative dynamic programming application may include iteratively computing an accumulated regularized maximum energy map of the signal column by column for all entries. In a further example embodiment, the iterative dynamic programming application may further include backtracking from a maximum entry of a last column of the accumulated regularized maximum energy map. According to an example embodiment, the iterative dynamic programming application may also include determining, by a relative energy ratio, the existence of a frequency component within a time window of the signal. According to another example embodiment, the multiple frequency traces tracking and detection procedure may include an adaptive multi-trace carving application. According to a further example embodiment, the adaptive multi-trace carving application may include iteratively running the iterative dynamic programming application, and attenuating diffused energy around the frequency component.

Figure 20:
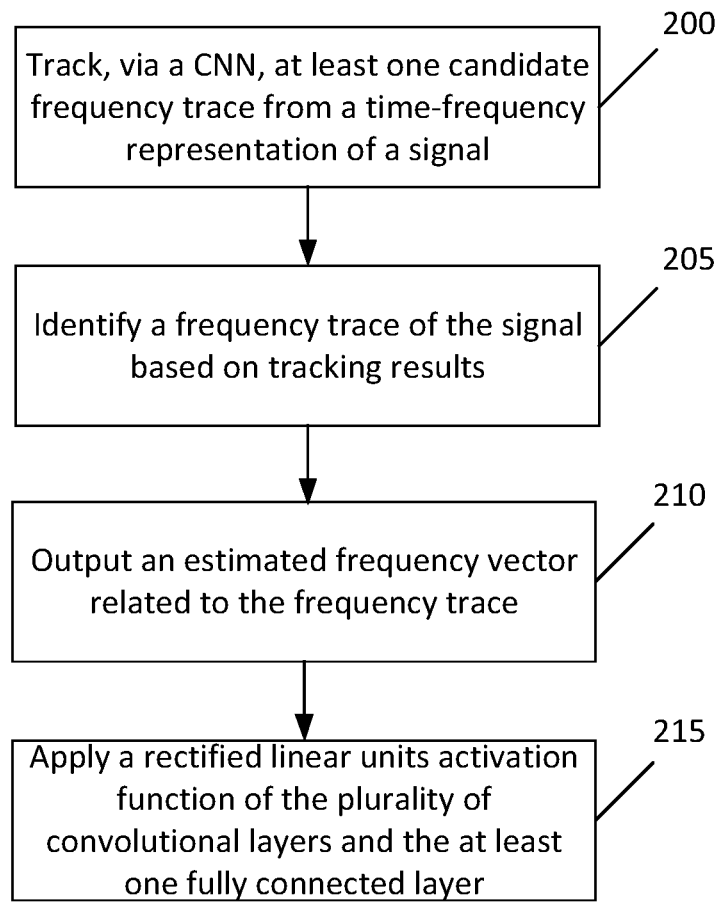
FIG. 20 illustrates a flow diagram of another method, according to an example embodiment.

FIG. 20 illustrates a flow diagram of another method, according to an example embodiment. In an example embodiment, the method of FIG. 20 may be performed by a computer, computer system, or an embedded system, for instance similar to apparatus 10 illustrated in FIG. 22. According to one example embodiment, the method of FIG. 20 may include initially, at 200, tracking, via a convolutional neural network, at least one candidate frequency trace from a time-frequency representation of a signal. The method may also include, at 205, identifying a frequency trace of the signal based on tracking results. The method may further include, at 210, outputting an estimated frequency vector related to the frequency trace. In addition, the method may include applying a rectified linear units activation function after each of the plurality of convolutional layers and the at least one fully connected layer. According to an example embodiment, the tracking may be performed under a noisy condition environment.

In an example embodiment, the convolutional neural network may include a plurality of convolutional layers, a plurality of pooling layers, and at least one fully connected layer. In another example embodiment, each of the plurality of convolutional layers may include a different filter size in frequency and in time. In a further example embodiment, the plurality of pooling layers may include a combination of maxpooling layers and an average pooling layer. According to an example embodiment, the convolutional neural network is implemented with a MATCONVNET® toolbox. According to another example embodiment, the convolutional neural network is heterogeneous in two dimensions of data frames.

Figure 21:
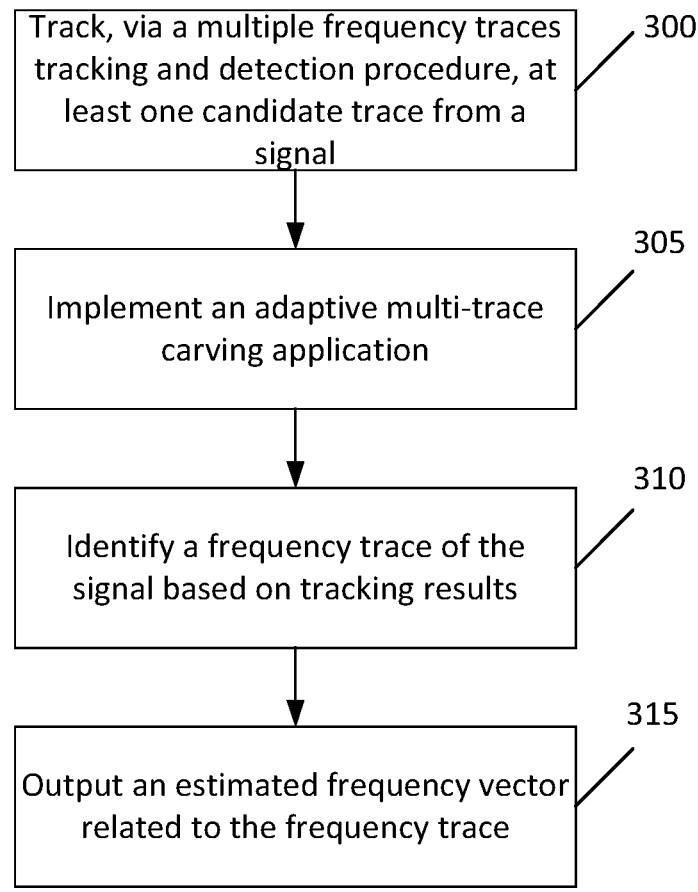
FIG. 21 illustrates a flow diagram of another method, according to an example embodiment.

FIG. 21 illustrates a flow diagram of another method, according to an example embodiment. In an example embodiment, the method of FIG. 20 may be performed by a computer, computer system, or an embedded system, for instance similar to apparatus 10 illustrated in FIG. 22. According to one example embodiment, the method of FIG. 21 may include initially, at 300, tracking, via a multiple frequency traces tracking and detection procedure, at least one candidate frequency trace from a signal. The method may also include, at 305, implementing an adaptive multi-trace carving application. The method may further include, at 310, identifying a frequency trace of the signal based on tracking results. The method may also include, at 315, outputting an estimated frequency vector related to the frequency trace. In an example embodiment, the tracking may be performed under a noisy condition environment.

According to an example embodiment, the multiple frequency traces tracking and detection procedure may include an iterative dynamic programming application and an adaptive trace compensation application. According to another example embodiment, the iterative dynamic programming application may include iteratively computing an accumulated regularized maximum energy map of the signal column by column for all entries. According to a further example embodiment, the iterative dynamic programming application may also include backtracking from a maximum entry of a last column of the accumulated regularized maximum energy map. In an example embodiment, the iterative dynamic programming application further may include determining, by a relative energy ratio, the existence of a frequency component within a time window of the signal. In another example embodiment, the multiple frequency traces tracking and detection procedure may include an adaptive multi-trace carving application. In a further example embodiment, the adaptive multi-trace carving application may include iteratively running the iterative dynamic programming application, and attenuating diffused energy around the frequency component.

Figure 22:
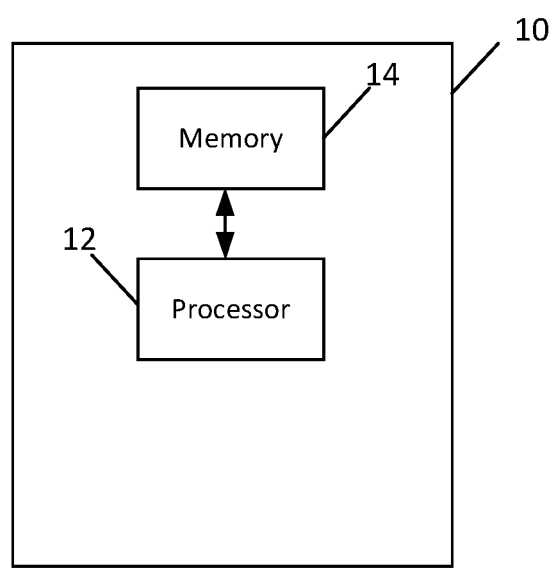
FIG. 22 illustrates an apparatus, according to an example embodiment.

FIG. 22 illustrates an apparatus 10 according to an example embodiment. In an embodiment, apparatus 10 may be a computer, computer system, or an embedded system. In some example embodiments, apparatus 10 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatus 10 may include components or features not shown in FIG. 22.

As illustrated in the example of FIG. 22, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 22, multiple processors may be utilized according to other embodiments. For example, it should be understood that, in certain example embodiments, apparatus 10 may include two or more processors that may form a multiprocessor system (e.g., in this case, processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-21.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read-only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-21.

Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

Certain example embodiments described herein provide several technical improvements, enhancements, and/or advantages. In some example embodiments, it may be possible to provide a CNN that effectively tracks instantaneous frequency in strong noise environments. It may also be possible to provide a heterogeneous CNN design that enables the model to deal with input spectrograms with any time duration. It may also be possible to outperform other existing representative approaches, especially under low SNR scenarios. In addition, it may be possible to address the problem of estimating and tracking multiple weak frequency components from spectrogram images, and provide both offline and online versions of AMTC algorithms. Further, it may be possible to provide accurate estimates even for weak frequency traces by using iterative forward and backward dynamic trace estimation and adaptively trace carving, allowing AMTC to provide accurate estimates even for weak frequency traces. Certain example embodiments may further show robustness and consistency on both synthetic and real-world data with different levels of noise in an efficient manner According to other example embodiments, it may be possible to conduct extensive experiments using challenging synthetic and real-world forensic data. For instance, it may be possible to implement several estimation methods for other applications (e.g., the pitch estimation), re-trained (the factorial hidden Markov model based method), and other comparable methods. The results demonstrate that the approaches of certain example embodiments outperform other existing arts in terms of accuracy and efficiency. Another example embodiment may provide a method based on the AMTC framework to accurately test the presence of trace.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a recording medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

AMTC Adaptive Multi-Trace Carving
CNN Convolutional Neural Network
ENF Electric Network Frequency
fHMM Factorial Hidden Markov Model
HMM Hidden Markov Model
PR Pulse Rate
RER Relative Energy Ratio
rPPG Remote-Photoplethysmography

We claim:

1. A method of authenticating frequency traces, comprising:
    iteratively tracking at least one candidate frequency trace from a time-frequency representation of a signal;
    identifying all frequency traces of the signal via a multiple frequency traces tracking and detection procedure, wherein the multiple frequency traces tracking and detection procedure comprises
        identifying at least one frequency trace comprising diffused energy of the signal within a predefined frequency range based on tracking results, and
        determining an estimated frequency vector related to the at least one frequency trace by implementing an energy function, wherein the energy function comprises the time-frequency representation of the signal to be analyzed, and a regularization parameter that enforces smooth tracking results;
    outputting the estimated frequency vector related to the at least one frequency trace;
    reducing interference in subsequent iterations of tracking the at least one candidate frequency trace by attenuating, at an end of each iteration, diffused energy around the at least one frequency trace indicated by the estimated frequency vector; and
    authenticating the identified frequency traces by validating all the identified and attenuated frequency traces against a reference source,
    wherein the tracking is performed under a noisy condition environment.

2. The method according to claim 1, wherein the tracking and outputting are performed via a convolutional neural network or the multiple frequency traces tracking and detection procedure.

3. The method according to claim 2, wherein the convolutional neural network comprises a plurality of convolutional layers, a plurality of pooling layers, and at least one fully connected layer.

4. The method according to claim 3, wherein each of the plurality of convolutional layers comprises a different filter size in frequency and in time.

5. The method according to claim 3, wherein the plurality of pooling layers comprises a combination of maxpooling layers and an average pooling layer.

6. The method according to claim 3, wherein the method further comprises applying a rectified linear units activation function after each of the plurality of convolutional layers and the at least one fully connected layer.

7. The method according to claim 2, wherein the multiple frequency traces tracking and detection procedure comprises an iterative dynamic programming application and an adaptive trace compensation application.

8. The method according to claim 7, wherein the iterative dynamic programming application comprises iteratively computing an accumulated regularized maximum energy map of the signal column by column for all entries.

9. The method according to claim 7, wherein the iterative dynamic programming application further comprises backtracking from a maximum entry of a last column of the accumulated regularized maximum energy map.

10. The method according to claim 7, wherein the iterative dynamic programming application further comprises determining, by a relative energy ratio, a presence of a frequency component within a time window of the signal.

11. The method according to claim 2, wherein the multiple frequency traces tracking and detection procedure comprises an adaptive multi-trace carving application.

12. The method according to claim 11, wherein the adaptive multi-trace carving application comprises iteratively running an iterative dynamic programming application, and attenuating diffused energy around the frequency component.

13. An apparatus, comprising:
    at least one processor; and
    at least one memory comprising computer program code,
    the at least one memory and the computer program code are configured, with the at least one processor to cause the apparatus at least to
    iteratively track at least one candidate frequency trace from a time-frequency representation of a signal;
    identify all frequency traces of the signal via a multiple frequency traces tracking and detection procedure, wherein the multiple frequency traces tracking and detection procedure comprises
        identification of at least one frequency trace comprising diffused energy of the signal within a predefined frequency range based on tracking results, and
        determination of an estimated frequency vector related to the at least one frequency trace by implementing an energy function, wherein the energy function comprises the time-frequency representation of the signal to be analyzed, and a regularization parameter that enforces smooth tracking results;
    output the estimated frequency vector related to the at least one frequency trace;
    reduce interference in subsequent iterations of tracking the at least one candidate frequency trace by attenuating, at an end of each iteration, diffused energy around the at least one frequency trace indicated by the estimated frequency vector; and
    authenticate the identified frequency traces by validating all the identified and attenuated frequency traces against a reference source,
    wherein the tracking is performed under a noisy condition environment.

14. A computer program embodied on a non-transitory computer-readable medium, said computer program comprising program instructions stored thereon for performing a method, the method comprising:
    iteratively tracking at least one candidate frequency trace from a time-frequency representation of signal;
    identifying all frequency traces of the signal via a multiple frequency traces tracking and detection procedure, wherein the multiple frequency traces tracking and detection procedure comprises identifying at least one frequency trace comprising diffused energy of the signal within a predefined frequency range based on tracking results, and determining an estimated frequency vector related to the at least one frequency trace by implementing an energy function, wherein the energy function comprises the time-frequency representation of the signal to be analyzed, and a regularization parameter that enforces smooth tracking results;

outputting the estimated frequency vector related to the at least one frequency trace;

reducing interference in subsequent iterations of tracking the at least one candidate frequency trace by attenuating, at an end of each iteration, diffused energy around the at least one frequency trace indicated by the estimated frequency vector; and authenticating the identified frequency traces by validating all the identified and attenuated frequency traces against a reference source, wherein the tracking is performed under a noisy condition environment.

* * * * *